United States Patent
Lee et al.

(10) Patent No.: US 11,256,137 B2
(45) Date of Patent: Feb. 22, 2022

(54) BACKLIGHT UNIT INCLUDING LIGHT SOURCES SURROUNDED BY SIDE MOLD AND DISPLAY DEVICE INCLUDING THE SAME

(71) Applicant: Samsung Display Co., Ltd., Yongin-Si (KR)

(72) Inventors: Dong Hyeon Lee, Seoul (KR); Young Min Park, Yongin-si (KR)

(73) Assignee: Samsung Display Co., Ltd.

(\*) Notice: Subject to any disclaimer, the term of this patent is extended or adjusted under 35 U.S.C. 154(b) by 0 days.

(21) Appl. No.: 17/102,129

(22) Filed: Nov. 23, 2020

(65) Prior Publication Data

US 2021/0263379 A1    Aug. 26, 2021

(30) Foreign Application Priority Data

Feb. 25, 2020  (KR) .................. 10-2020-0022747

(51) Int. Cl.
    *G02F 1/00*    (2006.01)
    *G02F 1/13357*    (2006.01)
    *G02F 1/1335*    (2006.01)

(52) U.S. Cl.
CPC .. *G02F 1/133608* (2013.01); *G02F 1/133603* (2013.01); *G02F 1/133605* (2013.01); *G02F 1/133606* (2013.01); *G02F 1/133614* (2021.01)

(58) Field of Classification Search
CPC ......... G02F 1/133608; G02F 1/133603; G02F 1/133605; G02F 1/133606; G02F 1/133614
See application file for complete search history.

(56) References Cited

U.S. PATENT DOCUMENTS

| | | | |
|---|---|---|---|
| 2018/0107068 A1* | 4/2018 | Sasaki | G02F 1/133606 |
| 2019/0094616 A1* | 3/2019 | Kim | G02F 1/133605 |
| 2020/0183234 A1* | 6/2020 | Kim | G02F 1/133611 |
| 2020/0192014 A1* | 6/2020 | Yoon | G02B 6/0088 |
| 2020/0209461 A1* | 7/2020 | Achi | G02B 6/0021 |
| 2020/0279979 A1* | 9/2020 | Lee | H01L 25/0753 |

(Continued)

FOREIGN PATENT DOCUMENTS

| | | |
|---|---|---|
| KR | 10-0528011 B1 | 2/2006 |
| KR | 10-2012-0069629 A | 6/2012 |
| KR | 10-1702695 B1 | 2/2017 |

(Continued)

*Primary Examiner* — Gerald J Sufleta, II
(74) *Attorney, Agent, or Firm* — Innovation Counsel LLP

(57) ABSTRACT

A backlight unit and a display device are disclosed. The backlight unit includes a substrate, light sources, a side mold, a resin layer, and an optical member. The light sources are disposed on a surface of the substrate. The side mold is fixed to the substrate and surrounds the light sources. The resin layer fills a region defined by the side mold. The optical member is disposed on the resin layer. A first height of the side mold measured from the surface of the substrate is greater than a second height of the resin layer measured from the surface of the substrate. The display device includes the backlight unit and a display panel disposed on the backlight unit. Manufacture of the unit includes forming the substrate with the light units disposed on the surface, attaching the side mold to the substrate, and forming the resin layer and the optical member.

21 Claims, 21 Drawing Sheets

(56) References Cited

U.S. PATENT DOCUMENTS

2020/0379298 A1* 12/2020 Notoshi ............ G02F 1/133611

FOREIGN PATENT DOCUMENTS

| KR | 10-2018-0036216 A | | 4/2018 |
| --- | --- | --- | --- |
| KR | 10-2019-0048225 A | | 5/2019 |
| KR | 20190048225 A | * | 5/2019 |
| KR | 10-2019-0083017 A | | 7/2019 |

* cited by examiner

BACKLIGHT UNIT INCLUDING LIGHT SOURCES SURROUNDED BY SIDE MOLD AND DISPLAY DEVICE INCLUDING THE SAME

CROSS-REFERENCE TO RELATED APPLICATION

This application claims priority to and benefit of Korean Patent Application No. 10-2020-0022747, filed on Feb. 25, 2020, in the Korean Intellectual Property Office, and all the benefits accruing therefrom under 35 U.S.C. § 119, the disclosure of which is incorporated herein by reference in its entirety.

BACKGROUND

1. Field

The present disclosure relates to a backlight unit and a display device including the same, and more particularly to a backlight unit in which a side mold is fixed onto a substrate having a plurality of light sources disposed thereon, and in which a resin layer and an optical member are disposed on the substrate, in a region defined by the side mold.

Description of the Related Art

A liquid crystal display (LCD) device receives light from a backlight unit to display an image. The backlight unit includes a plurality of light sources. Light emitted from the light sources is incident upon an LCD panel via optical films and the like.

Recently, research has been conducted on the application of wavelength conversion sheets to improve the display quality of LCD devices such as color reproducibility. Typically blue light sources are used as light sources for LCD devices, and wavelength conversion sheets are disposed on the path of light from the light sources to convert light emitted from the light sources into white light. As the demand for large-size display devices has increased, the sizes of substrates and backlight units for display devices have increased.

SUMMARY

Embodiments of the present disclosure provide a backlight unit in which a side mold is fixed onto a substrate having a plurality of light sources disposed thereon, and in which a resin layer and an optical member are disposed on the substrate, in a region defined by the side mold.

Embodiments of the present disclosure also provide a backlight unit in which a plurality of substrates having a plurality of light sources disposed thereon are connected to one another.

Embodiments of the present disclosure also provide a display device including a backlight unit in which a plurality of substrates having a plurality of light sources disposed thereon are connected to one another.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, a backlight unit includes a substrate, a plurality of light sources disposed on a first surface of the substrate, a side mold having a closed loop shape and fixed on the substrate, the side mold surrounding the light sources, a resin layer filling a region defined by the side mold, and an optical member disposed on the resin layer, in the region defined by the side mold.

In an example embodiment, the backlight unit includes an adhesive layer interposed between the substrate and the side mold, and wherein the side mold is disposed on the first surface of the substrate and fixed on the first surface of the substrate by the adhesive layer.

In an example embodiment, side surfaces of the optical member are aligned with side surfaces of the resin layer.

In an example embodiment, the substrate includes a plurality of grooves, which are on a second surface of the substrate that is opposite to the first surface of the substrate, the side mold includes a partition wall, which is disposed to surround side surfaces of the substrate, and a plurality of fastening parts, which protrude from the partition wall and correspond to the plurality of grooves, and the side mold is fastened and fixedly attached to the substrate by the fastening parts.

In an example embodiment, the side surfaces of the substrate, side surfaces of the optical member, and side surfaces of the resin layer are aligned with one another and are in direct contact with inner side surfaces of the partition wall.

In an example embodiment, a height of the side mold is greater than a height of the resin layer.

In an example embodiment, the backlight unit includes a reflective layer disposed on the first surface of the substrate and a plurality of openings are formed in the reflective layer, which expose the light sources.

In an example embodiment, the reflective layer and the light sources do not overlap in a thickness direction of the substrate.

In an example embodiment, the backlight unit includes a reflective coating layer disposed on inner side surfaces of the side mold.

In an example embodiment, the light sources are light-emitting diodes (LEDs) or LED chips.

In an example embodiment, the substrate is a printed circuit board (PCB).

According to an embodiment of the present disclosure, a backlight unit includes a light source member including a plurality of light source units, which are arranged in a matrix form and are disposed adjacent to one another, a side mold disposed along edges of the light source member, a resin layer filling a region, defined by the side mold, to cover the light source member, and an optical member disposed on the resin layer, in the region defined by the side mold, wherein each of the plurality of light source units includes a substrate and a plurality of light sources, which are disposed on the substrate, and substrates of each pair of adjacent light source units are connected.

In an example embodiment, the plurality of light source units include a first light source unit and a second light source unit, which is disposed on a first side of the first light source unit, and a first substrate of the first light source unit and a second substrate of the second light source unit are coupled.

In an example embodiment, a first side of the first substrate, on the first side of the first light source unit, is in direct contact with a second side of the second substrate, on a second side of the second light source unit that is opposite to a first side of the second light source unit.

In an example embodiment, a first side of the substrate of the first light source unit, on the first side of the first light source unit, and a second side of the substrate of the second light source unit, on a second side of the second light source unit that is opposite to a first side of the second light source unit, include a pair of complementary patterns of protrusions and recesses.

In an example embodiment, the side mold is disposed on the first and second light source units to surround the plurality of light sources of each of the first and second light source units.

In an example embodiment, the optical member includes a wavelength filter layer which is disposed on the resin layer and in direct contact with the resin layer, a diffusion sheet which is disposed on the wavelength filter layer, and a wavelength conversion sheet which is disposed on the diffusion sheet.

In an example embodiment, side surfaces of the resin layer is aligned with side surfaces of the wavelength filter layer, side surfaces of the diffusion sheet, and side surfaces of the wavelength conversion sheet.

According to an embodiment of the present disclosure, a display device comprises a backlight unit including a light source member, the light source member including a plurality of light source units, which are arranged in a matrix form and are disposed adjacent to one another, a side mold disposed to surround the light source member, a resin layer filling a region, defined by the side mold, to cover the light source member, and an optical member disposed on the resin layer, in the region defined by the side mold, and a display panel disposed on the backlight unit, wherein each of the plurality of light source units includes a substrate and a plurality of light sources, which are disposed on the substrate, substrates of each pair of adjacent light source units are connected, and the side mold is fixed on the substrates of the plurality of light source units.

In an example embodiment, a height from top surfaces of the substrate to a top surface of the side mold is greater than a height from the top surfaces of the substrates to a top surface of the optical member.

According to the aforementioned and other embodiments of the present disclosure, a backlight unit, in which a side mold is fixed on a printed circuit board (PCB) and a resin layer and an optical member are disposed in a region defined by the side mode, can be provided. During a molding process for forming the resin layer, the side mold can guide a material for forming the resin layer and can adjust the height of the resin layer. After the molding process, the side mold can fix other elements of the backlight unit and can thus improve the efficiency of the fabrication of the backlight unit.

In addition, since the backlight unit is formed by connecting a plurality of PCBs, the number of light sources provided per unit area can become uniform, and as a result, a display device with uniform luminance can be provided.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

The present disclosure will now be described more fully hereinafter with reference to the accompanying drawings, in which preferred embodiments of the present disclosure are shown. This present disclosure may, however, be embodied in different forms and should not be construed as limited to the embodiments set forth herein. Rather, these embodiments are provided so that this disclosure will be thorough and complete, and will filly convey the scope of the present disclosure to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Embodiments of the present disclosure will hereinafter be described with reference to the accompanying drawings.

Figure 1:
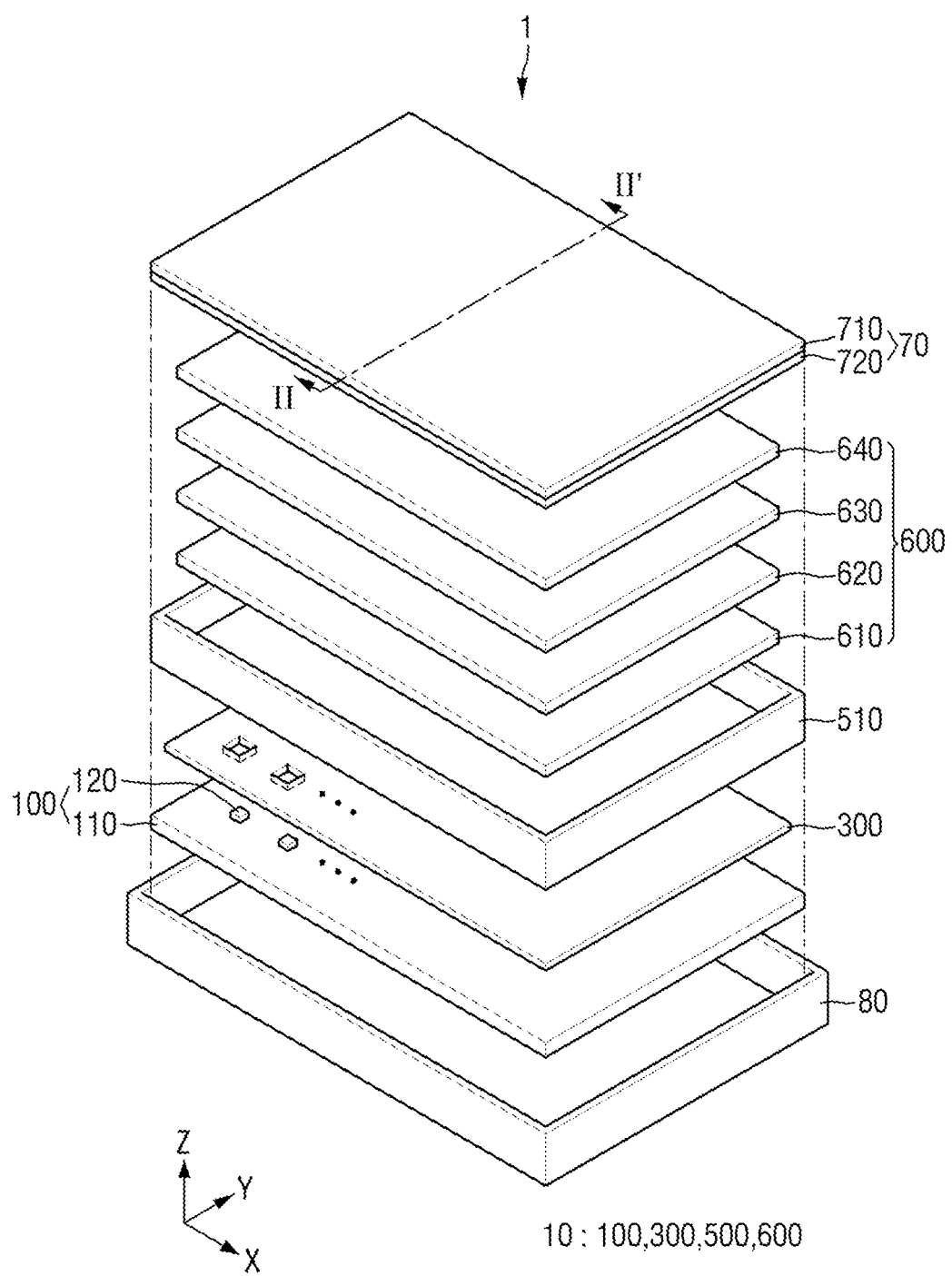
FIG. 1 is an exploded perspective view of a display device according to an embodiment of the present disclosure.
Figure 2:
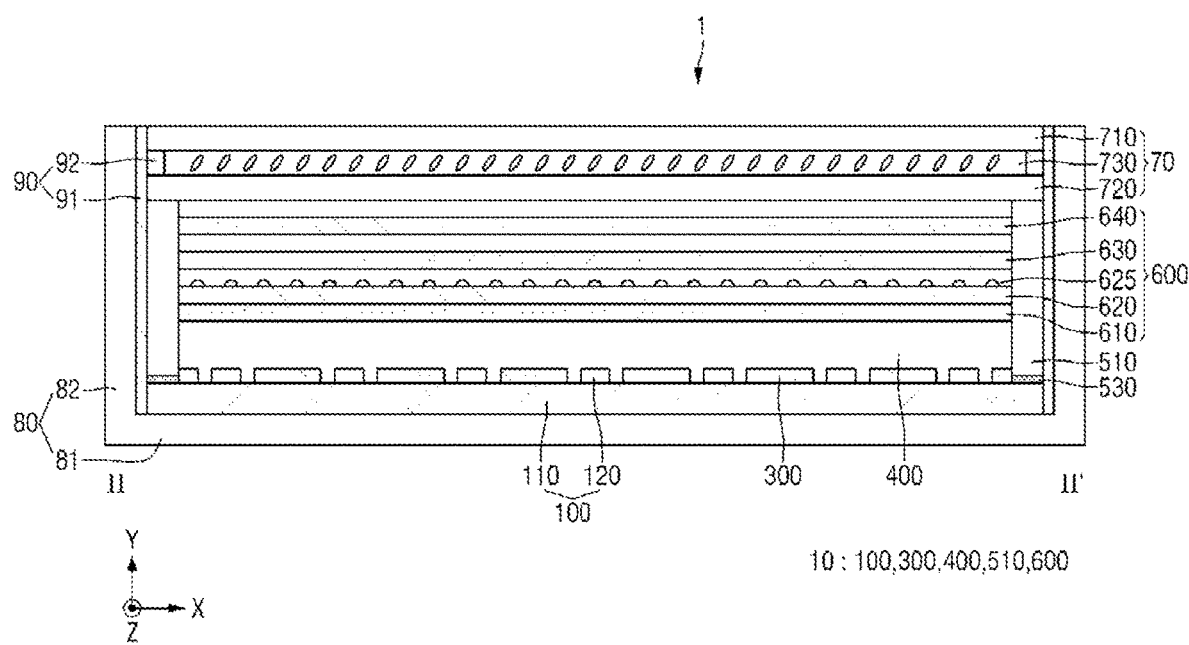
FIG. 2 is a cross-sectional view taken along line II-IF of FIG. 1.

FIG. 1 is an exploded perspective view of a display device according to an embodiment of the present disclosure. FIG. 2 is a cross-sectional view taken along line II-IF of FIG. 1.

Referring to FIGS. 1 and 2, a display device 1 may be applicable to various electronic devices such as a television (TV), an external billboard, a monitor, a personal computer (PC), a notebook computer, a tablet PC, a smartphone, a car navigation device, a camera, a center information display (CID) for a car, a wristwatch-type electronic device, a personal digital assistant (PDA), a portable multimedia player (PMP), or a gaming console, but the present disclosure is not limited thereto. Obviously, the display device 1 may also be applicable to other electronic devices than those set forth herein.

First, second, and third directions X, Y, and Z are defined as illustrated in the accompanying drawings. Specifically, the first and second directions X and Y may be directions that are perpendicular to each other within the same plane. The third direction Z may be a direction that is perpendicular to the plane that includes the first and second directions X and Y. The third direction Z may be perpendicular to each of the first and second directions X and Y. The third direction Z refers to the thickness direction of the display device 1.

Unless specified otherwise, the terms "above" and "top", as used herein, refer to the third direction Z (or one side in the thickness direction of the display device 1), and the term "top surface", as used herein, refers to a surface that is directed to the third direction Z. Also, unless specified otherwise, the terms "below" and "bottom", as used herein, refer to the opposite direction of the third direction Z (or the other side in the thickness direction of the display device 1), and the term "bottom surface", as used herein, refers to a surface that is directed to the opposite direction of the third direction Z. Also, unless specified otherwise, the terms "left", "right", "upper", and "lower", as used herein, refer to their respective directions in a plan view. For example, the term "right" refers to the first direction X, the term "left" refers to the opposite direction of the first direction X, the term "upper" refers to the second direction Y, and the term "lower" refers to the opposite direction of the second direction Y.

The display device 1 may have a rectangular shape that is longer in the first direction X than in the second direction Y in a plan view. The corners at which the long sides and the short sides of the display device 1 meet may be right-angled, but the present disclosure is not limited thereto. Alternatively, the corners at which the long sides and the short sides of the display device 1 meet may be rounded. However, the planar shape of the display device 1 is not particularly limited. The display device 1 may have various shapes other than a rectangular shape, such as a square shape, a circular shape, an elliptical shape, or another polygonal shape. A display surface of the display device 1 may be disposed on one side, in the thickness direction, of the display device 1.

The display device 1 may include a display panel 70, a backlight unit 10, which is disposed below the display panel 70 and provides light to the display panel 70, and a housing 80, which receives the display panel 70 and the backlight unit 10.

The display panel 70 may receive light emitted from the backlight unit 10 to display an image. The display panel 70 may be a light-receiving display panel such as, for example, a liquid crystal display (LCD) panel, an electrowetting display panel, or an electrophoretic display panel. For convenience, the display panel 70 will hereinafter be described as being an LCD panel, but the present disclosure is not limited thereto.

The display panel 70 may include an upper substrate 710, a lower substrate 720, which faces the upper substrate 710, and a liquid crystal layer 730, which is disposed between the upper and lower substrates 710 and 720. The display panel 70 may further include a plurality of pixels. The pixels of the display panel 70 may be arranged in rows and columns. The display panel 70 may include a switching element and a pixel electrode in each of the pixels and may further include a common electrode that faces the pixel electrode. The switching element and the pixel electrode may be disposed on the lower substrate 720, and the common electrode may be disposed on the upper substrate 710. However, the present disclosure is not limited thereto. Alternatively, the common electrode may also be disposed on the lower substrate 720. A sealing member 92 may be disposed along the edges of each of the upper and lower substrates 710 and 720 to confine liquid crystal molecules in the liquid crystal layer 730.

The backlight unit 10 is disposed below the display panel 70. The backlight unit 10 may include a light source member 100, a reflective layer 300, a resin layer 400, a side mold 510, and an optical member 600.

The light source member 100 may include a first substrate 110 and a plurality of light sources 120, which are disposed on the first substrate 110.

The light sources 120 emit light to be provided to the display panel 70. Light emitted from the light sources 120 may be incident upon the optical member 600 via the resin layer 400 above the light sources 120. The light sources 120 may be dot- or surface-light sources. In one embodiment, the light sources 120 may be light-emitting diodes (LEDs) or LED chips, but the present disclosure is not limited thereto. The light sources 120 may emit light substantially in an upward direction.

The light sources 120 may emit light of a particular wavelength range. For example, the light sources 120 may emit blue light having a wavelength range from about 420 nm to about 470 nm. In some embodiments, the light sources 120 may emit light having two or more peak wavelengths. For example, the light sources 120 may emit near ultraviolet (NUV) light and blue light.

The reflective layer 300 may be disposed on the first substrate 110 to surround at least one light source 120. That is, the reflective layer 300 is disposed on the same layer as the light source 120 and disposed between two adjacent light sources 120. The reflective layer 300 may reflect at least some of light that is emitted from the light sources 120 toward the optical member 600 through the resin layer 400, but reflected from, rather than transmitted through, the optical member 600, so that the reflected light can enter the optical member 600.

The resin layer 400 may be superimposed on the light source member 100 and the reflective layer 300. The resin layer 400 may be disposed on the light source member 100 and the reflective layer 300 to completely cover the light sources 120 and the reflective layer 300. The resin layer 400 may diffuse light emitted from the light sources 120. The resin layer 400 may prevent light emitted from the light sources 120 from being condensed when the emitted light enters the optical member 600.

The light source member 100, the reflective layer 300, and the resin layer 400 will be described later in detail.

The optical member 600 may be superimposed on the resin layer 400. The optical member 600 may include optical sheets, optical films, and/or optical plates. In one embodiment, the optical member 600 may include a wavelength filter layer 610, a light guide film 620, a diffusion sheet 630, and a wavelength conversion sheet 640.

The wavelength filter layer 610, the light guide film 620, the diffusion sheet 630, and the wavelength conversion sheet 640 are illustrated as being sequentially arranged in the third direction Z.

The wavelength filter layer 610 may be superimposed on the resin layer 400. The wavelength filter layer 610 transmits some of light incident thereupon from the light sources 120 through the resin layer 400 and reflects the rest of the light. The light reflectance of the wavelength filter layer 610 may vary depending on the wavelength and the angle of incidence of light upon the wavelength filter layer 610.

The light guide film 620 may be disposed on the wavelength filter layer 610. The light guide film 620 guides light, incident thereupon from the light sources 120 through the resin layer 400 and the wavelength filter layer 610, toward the display panel 70.

A light output pattern 625 may be further disposed on the top surface of the light guide film 620. The light output pattern 625 may be formed to protrude from the top surface of the light guide film 620. The light output pattern 625 may refract or reflect light traveling through the light guide film 620 so that the light can proceed toward the display panel 70.

The diffusion sheet 630 may be superimposed on the light guide film 620 and the light output pattern 625. The diffusion sheet 630 may be disposed to be spaced apart in the third direction Z from the light guide film 620 and the light output pattern 625. The diffusion sheet 630 may be disposed to be spaced apart from the light guide film 620 and the light output pattern 625 by a predetermined distance to disperse light emitted from the light source 120 and thus to prevent the light from being condensed. The diffusion sheet 630 diffuses light emitted from the light guide film 620 and the light output pattern 625 toward the display panel 70 so that the light can be provided to the display panel 70 at a uniform luminance.

The diffusion sheet 630 may include a material capable of transmitting light therethrough. The diffusion sheet 630 may include a material such as, for example, polymethyl methacrylate (PMMA), polypropylene (PP), polyethyleneterephthalate (PET), or polycarbonate (PC).

The wavelength conversion sheet 640 may be superimposed on the diffusion sheet 630. The wavelength conversion sheet 640 converts the wavelength of at least some of light emitted from the diffusion sheet 630 toward the display panel 70.

The wavelength conversion sheet 640 may include a binder layer and wavelength conversion particles, which are dispersed in the binder layer. The wavelength conversion sheet 640 may further include scattering particles, which are also dispersed in the binder layer.

The binder layer, which is a medium where the wavelength conversion particles are dispersed, may be formed of various resin compositions, but the present disclosure is not limited thereto. Any type of medium that can disperse the wavelength conversion particles and/or the scattering particles therein may be referred to as the binder layer regardless of the actual name, any additional functions, and ingredients thereof.

The wavelength conversion particles, which are particles that convert the wavelength of light incident thereupon, may be, for example, quantum dots (QDs), a fluorescent material, or a phosphorescent material. For convenience, the wavelength conversion particles will hereinafter be described as being QDs, but the present disclosure is not limited thereto.

The QDs, which are a material having a crystal structure of several nanometers in size, consist of hundreds to thousands of atoms, and may exhibit a quantum confinement effect in which the energy band gap increases, due to their small size. When light having a wavelength higher than the band gap is incident upon the QDs, the QDs absorb the light, become excited, emit light of a particular wavelength, and fall to the ground state. The light emitted from the QDs has a value corresponding to the band gap. By adjusting the size and composition of the QDs, light emission characteristics that result from the quantum confinement effect can be controlled.

The QDs may include at least one of, for example, a group II-VI compound, a group II-V compound, a group III-VI compound, a group III-V compound, a group IV-VI compound, a group II-IV-VI compound, and a group II-IV-V compound.

Each of the QDs may include a core and a shell that overcoats the core. The core may be, but not limited to, at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge. The shell may include, but is not limited to, at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe.

The wavelength conversion particles may include a plurality of wavelength conversion particles that convert the wavelength of incident light into different wavelengths. For example, the wavelength conversion particles may include first wavelength conversion particles that convert the wavelength of incident light into a first wavelength and second wavelength conversion particles that convert the wavelength of incident light into a second wavelength. In one embodiment, light incident upon the wavelength conversion particles from the light sources 120 may be light of a blue wavelength, the first wavelength is a green wavelength, and the second wavelength is a red wavelength. The blue wavelength may have a peak wavelength from about 420 nm to about 470 nm, the green wavelength may have a peak wavelength from about 520 nm to about 570 nm, and the red wavelength may have a peak wavelength from about 620 nm to about 670 nm. However, the blue, green, and red wavelengths are not particularly limited, but should be understood as encompassing all wavelength ranges that can be perceived as blue, green, and red, respectively.

Although not specifically illustrated, at least one optical sheet may be further disposed on the wavelength conversion sheet 640. The optical sheet may perform optical functions such as condensing, refraction, diffusion, reflection, polarization, and phase delay. Examples of the optical sheet include a prism sheet, a micro-lens sheet, a lenticular sheet, a polarizing sheet, a reflective polarizing sheet, a retardation sheet, and a protective sheet. In some embodiments, the optical sheet may have multiple layers having multiple optical functions incorporated thereinto.

The side mold 510 may be disposed on the first substrate 110. The side mold 510 may be disposed along the outer edges of the first substrate 110 to surround the light sources 120, which are disposed on the first substrate 110. The side mold 510 may be disposed on the first substrate 110 in a closed loop shape having an opening in the middle (i.e., a cylindrical shape). The reflective layer 300, the resin layer 400, and the optical member 600 may be disposed in a region defined by the side mold 510. The optical member 600 may be fixed onto the inner side surfaces of the side mold 510 by an adhesive member.

The side mold 510 will be described later in detail.

The housing 80 receive the backlight unit 10 and the display panel 70. The housing 80 may include a bottom chassis or a bracket. Although not specifically illustrated, the housing 80 may further include a top chassis.

The housing 80 may have a bottom surface 81 and sidewalls 82. The sidewalls 82 may be connected to, and vertically bent from, the bottom surface 81. The light source member 100 of the backlight unit 10 is disposed on the bottom surface 81 of the housing 80. The backlight unit 10 and the display panel 70 may be fixedly attached to the sidewalls 82 of the housing 80 by an adhesive tape 91, but the present disclosure is not limited thereto. Alternatively, the backlight unit 10 and the display panel 70 may be mounted on another installation structure of the housing 80 or may be mounted on, or attached to, a mold frame provided in the housing 80.

Figure 3:
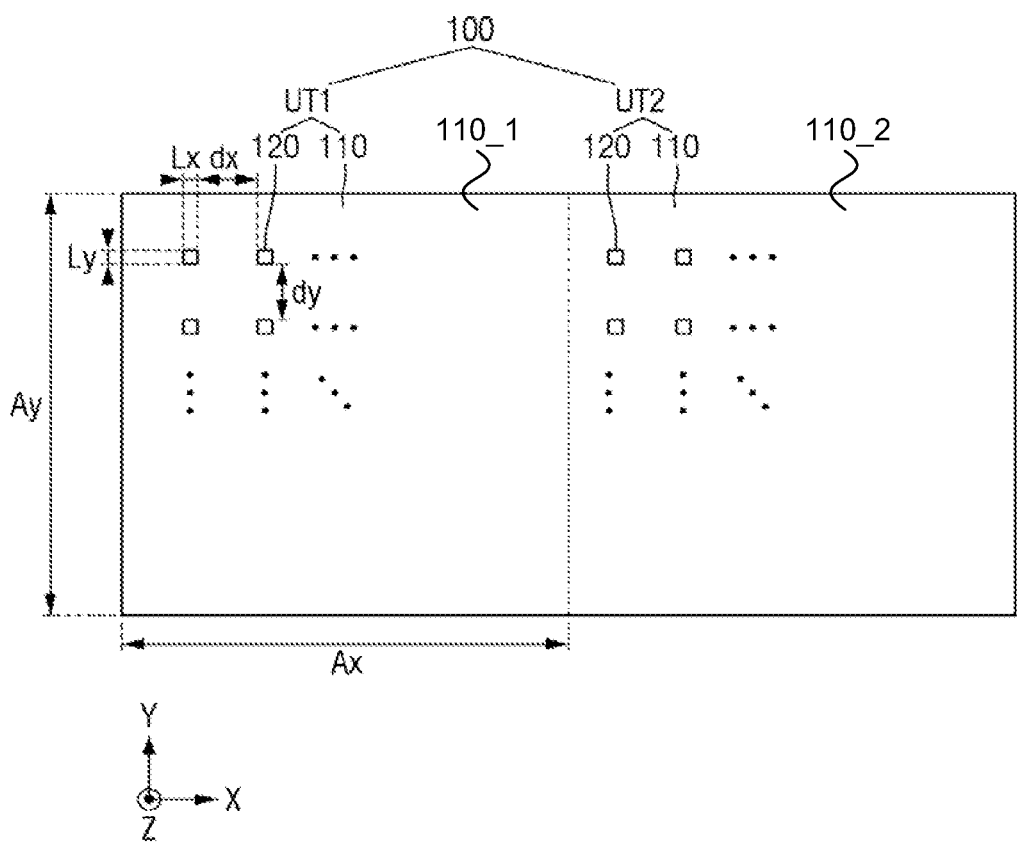
FIG. 3 is a plan view of a light source member according to an embodiment of the present disclosure.

FIG. 3 is a plan view of a light source member according to an embodiment of the present disclosure.

Referring to FIG. 3, the light source member 100 may have a similar planar shape to the display panel 70. For example, in a case where the display panel 70 has a rectangular shape in a plan view, the light source member 100 may have a similar rectangular shape in a plan view. In a plan view, the size of the light source member 100 may be substantially the same as the size of the display panel 70, but the present disclosure is not limited thereto.

The light source member 100 may include one or more light source units UT. The light source units UT may be arranged in a matrix form. The light source units UT may be disposed adjacent to one another. That is, pairs of adjacent light source units UT may be disposed to adjoin one another.

In one embodiment, the light source member 100 may include first and second light source units UT1 and UT2.

The first and second light source units UT1 and UT2 may be substantially the same (in terms of, for example, functions and structure), except for their locations. Features that the first and second light source units UT1 and UT2 have in common will hereinafter be described, taking the first light source unit UT1 as an example.

The first light source unit UT1 may include a first substrate 110 and a plurality of light sources 120, which are disposed on the first substrate 110.

The first substrate 110 may have a square shape in a plan view. In a plan view, a length Ax, in a first direction X, of the first substrate 110 and a length Ay, in a second direction Y, of the first substrate 110 may be the same. For example, the lengths Ax and Ay may range from about 280 mm to about 320 mm, or the lengths Ax and Ay may be about 300 mm. The first substrate 110 will hereinafter be described as having a square shape in a plan view, but the present disclosure is not limited thereto. Alternatively, the first substrate 110 may have various other shapes, such as a rectangular shape or a circular shape, in a plan view. That is, the first substrate 110 may have any polygonal shape.

The light sources 120 may have a square shape in a plan view. In a plan view, a length Lx, in the first direction X, of the light sources 120 and a length Ly, in the second direction Y, of the light sources 120 may both range from about 100 μm to about 500 μm. The light sources 120 will hereinafter be described as having a square shape in a plan view, but the present disclosure is not limited thereto. Alternatively, the light sources 120 may have various other shapes, such as a rectangular shape or a circular shape, in a plan view. That is, each of the light sources 120 may have any polygonal shape.

A plurality of light sources 120 may be arranged in a matrix on the first substrate 110. The light sources 120 may be disposed at regular intervals to be spaced apart from one another in the first direction X and second direction Y in a plan view. That is, the light-emitting parts of the light sources 120 are disposed to be spaced apart from one another. Thus, the light sources 120 may be interpreted as being spaced apart from one another not only when the light packages of the light sources 120 are spaced apart from one another, but also when the light packages of the light sources 120 adjoin one another or are even connected to one another, if the light-emitting parts of the light sources 120 are spaced apart from one another. The number of light sources 120 disposed on the first substrate 110 may be, but not limited to, about 900.

The directions in which the light sources 120 are arranged are illustrated as coinciding with the directions in which the long sides and the short sides of the display device 1 extend, but the present disclosure is not limited thereto. Alternatively, the directions in which the light sources 120 are arranged may be inclined with respect to the directions in which the long sides and the short sides of the display device 1 extend.

A distance dx, in the first direction X, between two horizontally adjacent light sources 120 and a distance dy, in the second direction Y, between two vertically adjacent light sources 120 may be the same, but the present disclosure is not limited thereto. Alternatively, the distances dx, dy between two adjacent light sources 120 in the first direction X and the second direction Y may be different. The light sources 120 are illustrated as being arranged in rows and columns that extend rectilinearly, but the present disclosure is not limited thereto. Alternatively, the light sources 120 may be arranged in staggered rows and staggered columns.

Each of the first substrates 110 of the light source units UT may have first, second, third, and fourth sides in a plan view. The first side may refer to the right side in a plan view (i.e., one side in the first direction X), the second side may refer to the left side in a plan view (i.e., the other side in the first direction X), the third side may refer to the upper side in a plan view (i.e., one side in the second direction Y), and the fourth side may refer to the lower side in a plan view (i.e., the other side in the second direction Y).

As described above, the light source units UT may be arranged in a matrix. The first and second light source units UT1 and UT2 may be aligned side-by-side in the first direction X. That is, the second light source unit UT2 may be disposed to adjoin the first light source unit UT1 in the first direction X. The first substrate 110 of the first light source unit UT1 may be referred to as a first light-source-unit substrate 110_1. The first substrate 110 of the second light source unit UT2 may be referred to as a second light-source-unit substrate 110_2.

In a plan view, the upper side of the first substrate 110 of the first light source unit UT1 and the upper side of a first substrate 110 of the second light source unit UT2 may be aligned side-by-side. Similarly, in a plan view, the lower side of the first substrate 110 of the first light source unit UT1 and the lower side of the first substrate 110 of the second light source unit UT2 may be aligned side-by-side. The right side of the first substrate 110 of the first light source unit UT1 and the left side of the first substrate 110 of the second light source unit UT2 may adjoin each other. That is, the first and second light source units UT1 and UT2, which are adjacent to each other, may be disposed to adjoin each other.

Figure 4:
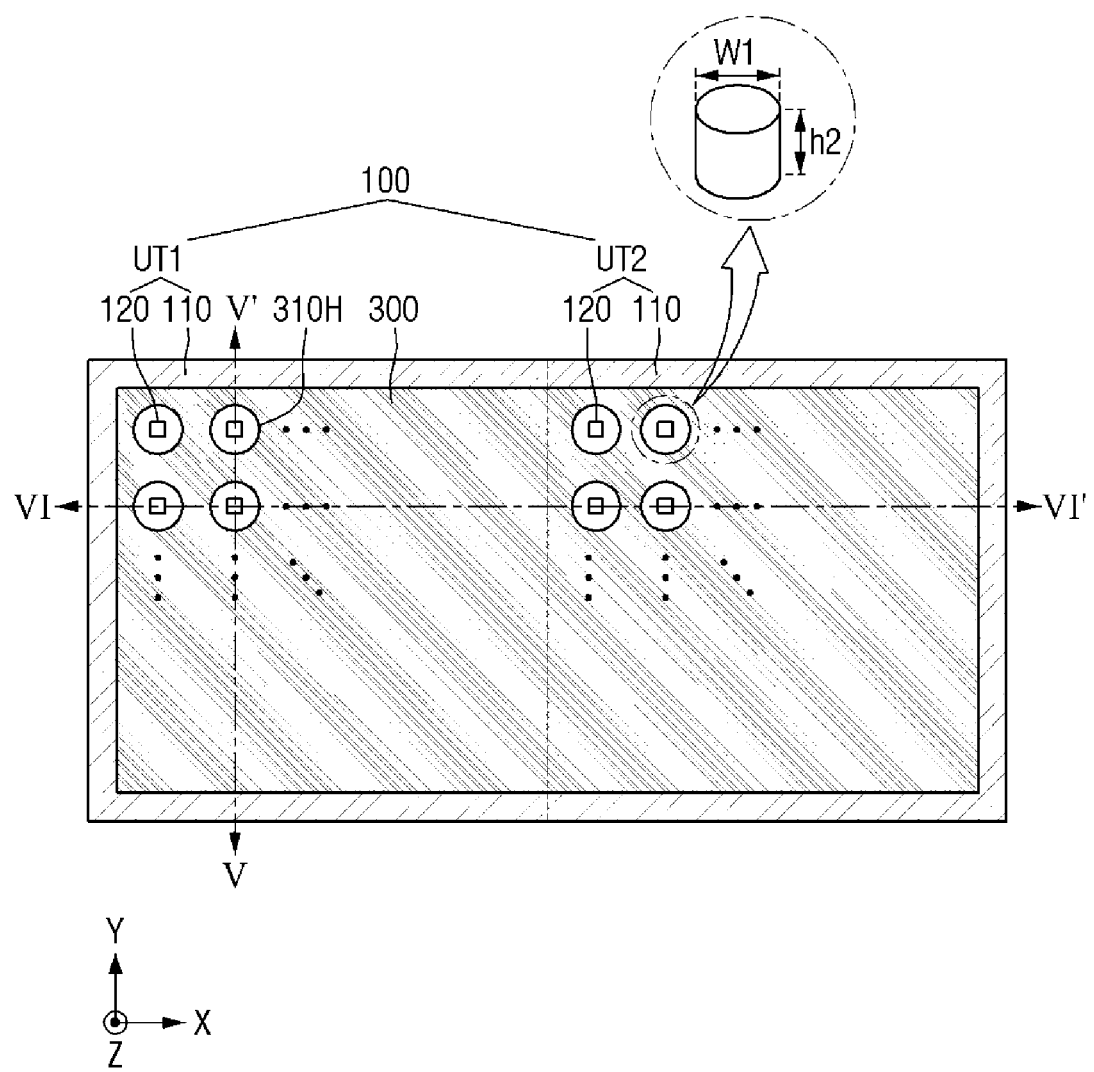
FIG. 4 is a layout view illustrating the relative positions of a light source member, a reflective layer, and a side mold according to an embodiment of the present disclosure.

FIG. 4 is a layout view illustrating the relative positions of a light source member, a reflective layer, and a side mold according to an embodiment of the present disclosure.

Referring to FIGS. 3 and 4, the reflective layer 300 may be disposed on the first and second light source units UT1 and UT2. Specifically, the reflective layer 300 may be disposed on entire first surfaces of the first substrates 110 of the first and second light source units UT1 and UT2, except for parts where light sources 120 are not disposed, but the present disclosure is not limited thereto. The reflective layer 300 may be disposed to correspond each of the first and second light source units UT1 and UT2.

The reflective layer 300 may have a similar planar shape to the display panel 70. For example, in a case where the display panel 70 has a rectangular shape in a plan view, the reflective layer 300 may have a similar rectangular shape in a plan view. In a plan view, the size of the reflective layer 300 may be smaller than the size of the first substrates 110 of the light source member 100, but the present disclosure is not limited thereto.

As depicted in FIG. 4, one or more openings 310H may be defined in the reflective layer 300. The openings 310H may be formed to completely penetrate the reflective layer 300 in the third direction Z (or in the thickness direction). The openings 310H may have a cylindrical shape with a predetermined width W1 and a predetermined height h2.

The height h2 of the openings 310H may be equal to the height of the reflective layer 300 along the third direction Z.

In a plan view, the openings 310H may all have the same circular shape having the same area, but the present disclosure is not limited thereto. Alternatively, the openings 310H may have various other shapes such as a square shape, an elliptical shape, or a rectangular shape in a plan view and may have different sizes from one another.

The openings 310H may be formed to be spaced apart from one another by a predetermined distance. The openings 310H may be formed to be a predetermined distance apart from one another in the first and second directions X and Y. The reflective layer 300 may be disposed for each of the openings 310H to expose at least one light source 120 in the third direction Z (or in the thickness direction). In one embodiment, the openings 310H may be formed to correspond one-to-one to the light sources 120.

The openings 310H, which are formed in the reflective layer 300, may be disposed to surround at least one light source 120. That is, the openings 310H may completely expose the light sources 120 in the third direction Z. In one embodiment, each of the openings 310H may have a larger area than each of the light sources 120 so that the light sources 120 may be completely exposed in the direction of the display surface of the display device 1.

Referring back to FIG. 2, the side mold 510 may be disposed in a closed-loop shape on the outer edges of each of the first substrates 110 of the light source member 100. The side mold 510 may be disposed on the edges of each of the first substrates 110 of the light source member 100 where the reflective layer 300 and the light sources 120 are disposed. The side mold 510 may be disposed to surround the light sources 120 and the reflective layer 300. The side mold 510 may be disposed to be a predetermined distance apart from the light sources 120 and may be disposed adjacent to the reflective layer 300, but the present disclosure is not limited thereto. Alternatively, the side mold 510 may be disposed to be a predetermined distance apart not only from the light sources 120, but also from the reflective layer 300.

In one embodiment, the outer edges of the light source member 100 may be formed by the upper, lower, and left sides of the first substrate 110 of the first light source unit UT1 and the upper, lower, and right sides of the first substrate 110 of the second light source unit UT2. In this embodiment, the side mold 510 may be disposed on the outer edges of the light source member 100, i.e., on the upper, lower, and left sides of the first substrate 110 of the first light source unit UT1 and on the upper, lower, and right sides of the first substrate 110 of the second light source unit UT2, and may be fixed on the first substrates 110 of the first and second light source units UT1 and UT2. Accordingly, the region defined by the side mold 510 may be a region in which the light sources 120 and the reflective layer 300 are disposed.

Figure 5:
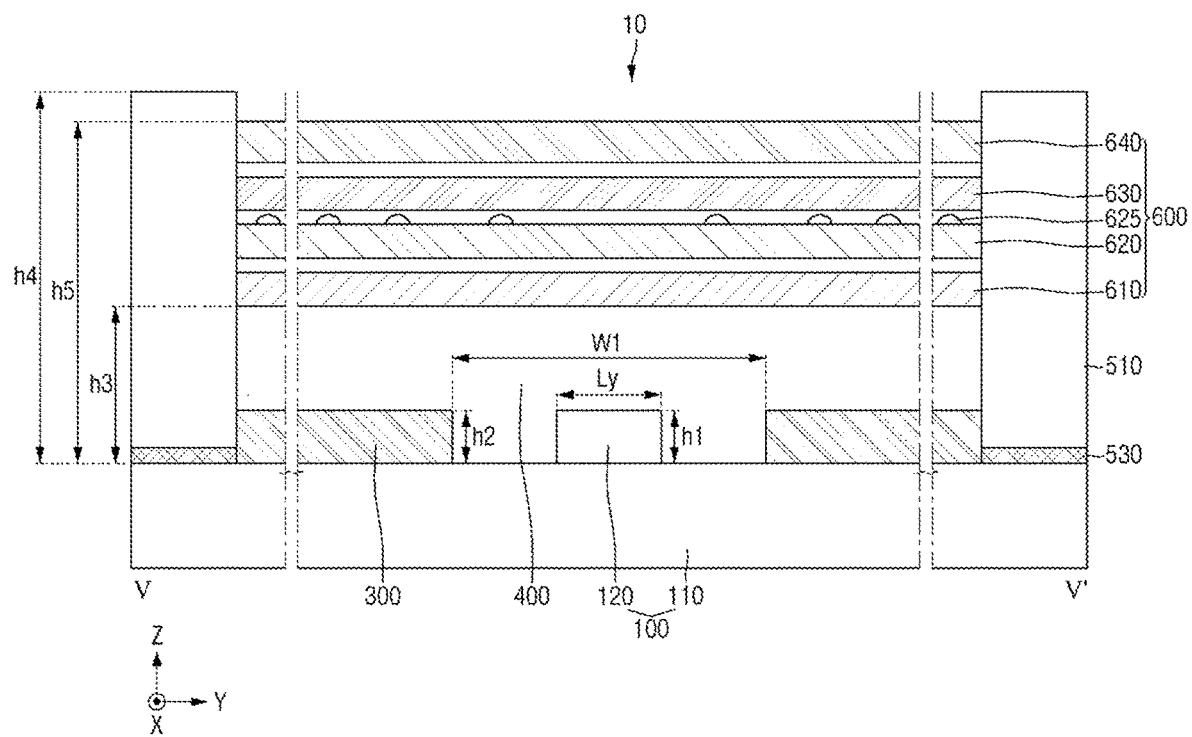
FIG. 5 is an example cross-sectional view taken along line V-V' of FIG. 4.
Figure 6:
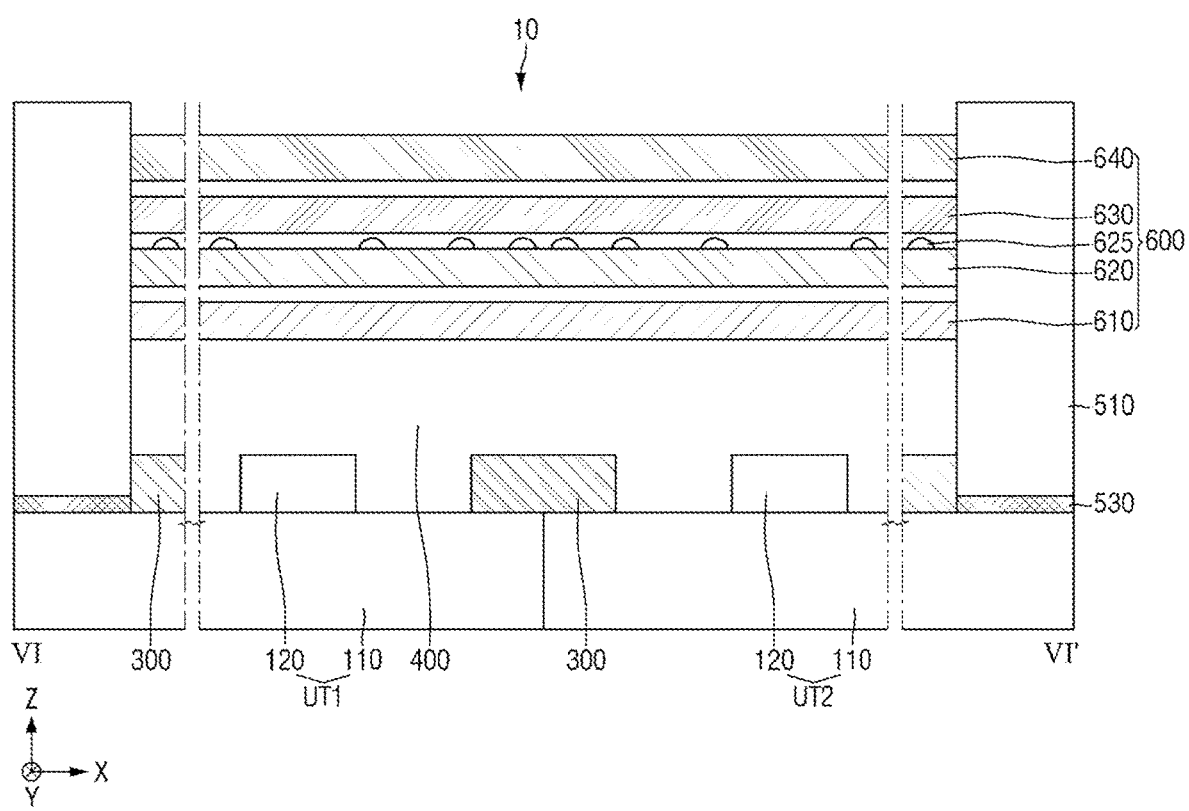
FIG. 6 is an example cross-sectional view taken along line VI-VI' of FIG. 4.

FIG. 5 is an example cross-sectional view taken along line V-V' of FIG. 4. FIG. 6 is an example cross-sectional view taken along line VI-VI' of FIG. 4.

Specifically, FIG. 5 is a cross-sectional view, taken along the second direction Y, of the backlight unit 10 of FIG. 4, and FIG. 6 is a cross-sectional view, taken along the first direction X, of the backlight unit 10 of FIG. 4. The cross-sectional structure of the backlight unit 10 will hereinafter be described with reference to FIGS. 5 and 6.

Referring to FIGS. 3, 4, and 5, the first substrates 110 may be circuit substrates or insulating substrates. In one embodiment, the first substrates 110 may be circuit substrates. In this embodiment, the first substrates 110 may be printed circuit boards (PCBs). In a case where the first substrates 110 are PCBs, a plurality of light sources 120 may be mounted on each of the first substrates 110. The light sources 120 mounted on each of the first substrates 110 may be electrically connected. However, the present disclosure is not limited thereto. In another embodiment, the first substrates 110 may be insulating substrates. In this embodiment, the first substrates 110 may include a transparent material such as glass or quartz or a polymer material such as polyimide. In a case where the first substrates 110 are insulating substrates, the light source member 100 may further include a circuit element layer (not illustrated) that drives the light sources 120. The circuit element layer may be formed on the first surfaces of the first substrates 110 or may be formed as a PCB to be attached or fixed to the first surfaces of the first substrates 110. For convenience, the first substrates 110 will hereinafter be described as being circuit substrates.

The light sources 120 may be disposed on the first surfaces of the first substrates 110 (i.e., the surfaces of the first substrates 110 that are directed to the third direction Z). The light sources 120 may include LEDs. Diffusion lenses (not shown) may be further disposed above the light sources 120, but alternatively, the light sources 120 may be directly exposed, as illustrated in FIGS. 5 and 6. Each of the light sources 120 may emit light substantially in the upward direction.

Each of the light sources 120 may have a rectangular shape in a plan view. That is, as depicted in FIGS. 3 and 5, the length Lx, in the first direction X, of the light sources 120 and the length Ly, in the second direction Y, of the light sources 120 may be about 100 μm and about 500 μm, respectively. A height h1 of the light sources 120 may be smaller than the lengths Lx and Ly of the light sources 120 and may be, for example, about 250 μm to about 300 μm. In one embodiment, each of the light sources 120 may have a square shape in a plan view, the lengths Lx and Ly of the light sources 120 may both be about 500 μm, and the height h1 of the light sources 120 (i.e., the distance, in the third direction Z, from the top surfaces of the first substrates 110 to the top surfaces of the light sources 120) may be about 250 μm.

A reflective layer 300 may be disposed on a portion of the first surfaces of the first substrate 110 where the light sources 120 are not disposed. The reflective layer 300 may reflect light emitted from the light sources 120 and then leaked sideways and/or light emitted from the light sources 120 and then reflected from, rather than transmitted through, the wavelength filter layer 300 so that the light can reenter the wavelength filter layer 300.

The reflective layer 300 may include a reflective material. The reflective layer 300 may be formed of a metal or a metal-based material such as, for example, silver (Ag), copper (Cu), aluminum (Al), nickel (Ni), lanthanum (La), or an alloy thereof, or for example, indium tin oxide (ITO), indium zinc oxide, or indium tin zinc oxide (ITZO).

The reflective layer 300 may be disposed to surround the light sources 120 in a plan view. In one embodiment, the reflective layer 300 may overlap the light sources 120 along the third direction Z. That is, the height h1 of the light source 120 is substantially equal to the height h2 of the reflective layer 300. In another embodiment, the reflective layer 300 may not completely overlap the light sources 120 in the third direction Z. That is, the height h1 of the light source 120 is substantially larger than the height h2 of the reflective layer 300. In another embodiment, the light sources 120 may not completely overlap the reflective layer 300 in the third direction Z. That is, the height h1 of the light source 120 is substantially smaller than the height h2 of the reflective layer 300. In one embodiment, as depicted in FIG. 3, the reflective layer 300 may include the openings 310H at the locations of the light sources 120, which are arranged in a matrix form, and may be spaced apart horizontally and vertically from the light sources 120 over the first substrates 110. The reflective layer 300 may not overlap with the light sources 120 in the third direction Z over the first substrates 110.

The reflective layer 300 has top and bottom surfaces. The top and bottom surfaces of the reflective layer 300 are opposite to each other. Each of the top and bottom surfaces of the reflective layer 300 may fall substantially on one plane, and the planes where the top and bottom surfaces of the reflective layer 300 are located may be generally parallel. Accordingly, the reflective layer 300 may generally have a uniform thickness. The bottom surface of the reflective layer 300 may be disposed on the first surface of the first substrate 110.

The reflective layer 300 may include sidewalls that are exposed by the openings 310H. The sidewalls of the reflective layer 300 may face the light sources 120. In one embodiment, the planes that the sidewalls of the reflective layer 300 are located may form an angle of about 90° with the plane where the top surface or the bottom surface of the reflective layer 300 is located. The sidewalls of the reflective layer 300 may form an angle of about 90° with respect to the plane where the top surfaces of the first substrates 110 are located.

The thickness or height h2 of the reflective layer 300 (i.e., the distance, in the third direction Z, from the first surfaces of the first substrates 110 to the top surface of the reflective layer 300) may be substantially equal to the height h1 of the light sources 120. In one embodiment, in a case where the height h1 of the light sources 120 is from about 250 μm to about 300 μm, the height h2 of the reflective layer 300 may be from about 250 μm to about 300 μm, but the present disclosure is not limited thereto.

The side mold 510 may be disposed on parts of the first substrates 110 where the reflective layer 300 and the light sources 120 are not disposed. During the formation of the resin layer 400, the side mold 510 may guide a material layer for forming the resin layer 400 to be properly placed and may adjust the height of the resin layer 400. Even after the formation of the resin layer 400, the side mold 510 may still be disposed on the first substrates 110 to fix the optical member 600.

The side mold 510 may include at least one of polycarbonate (PC), acrylonitrile butadiene styrene (ABS), polyethylene terephthalate (PET), and glass fiber (GF). In one embodiment, the side mold 510 may include the mixture of a polycarbonate resin and glass fiber (e.g., PC GF 10%).

The side mold 510 may have a top surface, a bottom surface, and side surfaces. The bottom surface of the side mold 510 may be disposed on the top surface of the first substrate 110. The top surface of the side mold 510 may be opposite to the bottom surface of the side mold 510. Each of the top and bottom surfaces of the side mold 510 may fall substantially on one plane, and the planes where the top and bottom surfaces of the reflective layer 300 are located may be generally parallel. Accordingly, the side mold 510 may generally have a uniform height.

As depicted in FIG. 5, a height h4 of the side mold 510 (i.e., the distance, in the third direction Z, from the first surfaces of the first substrates 110 to the top surface of the side mold 510) may be greater than the height h2 of the reflective layer 300, a height h3 of the resin layer 400, and/or a height h5 of the optical member 600 from the first substrate 110.

The side mold 510 may be fixed to the top surfaces of the first substrates 110 by an adhesive layer 530. The adhesive layer 530 may be interposed between the side mold 510 and the first substrates 110. The adhesive layer 530 may include, for example, a heat dissipation tape, a double-sided tape, a resin, urethane, and various other adhesives, but the present disclosure is not limited thereto. The top surface of the adhesive layer 530 may be in contact with the bottom surface of the side mold 510, and the bottom surface of the adhesive layer 530 may be in contact with the top surfaces of the first substrates 110. The side surfaces of the adhesive layer 530 may be formed in parallel to the side surfaces of the side mold 510.

The resin layer 400 may be disposed in the region defined by the side mold 510. The resin layer 400 may be disposed to entirely cover the light sources 120 and the reflective layer 300, which are disposed in the region defined by the side mold 510. Thus, the resin layer 400 may fill the gaps between the reflective layer 300 and the light sources 120. The resin layer 400 may be disposed to cover the top surface and side surfaces of each of the light sources 120 and of the reflective layer 300.

The thickness or height h3 of the resin layer 400 (i.e., the distance, in the third direction Z, from the first surfaces of the first substrates 110 to the top surface of the resin layer 400) may be greater than the height h1 of the light source 120. In one embodiment, the height h3 of the resin layer 400 may be from about 25 mm to about 27 mm, but the present disclosure is not limited thereto.

The resin layer 400 may protect the light sources 120 by covering the top surface and side surfaces of each of the light sources 120. Also, the resin layer 400 may prevent deformation of the optical member 600 by blocking some of heat from light emitted from the light sources 120. Also, the resin layer 400 may be disposed above the light sources 120 to diffuse light emitted from the light sources 120 without the aid of additional lenses. Thus, the resin layer 400 may improve luminance uniformity by preventing light emitted from the light sources 120 from being condensed only at the tops of the light sources 120.

The resin layer 400 may include a light-transmitting material. The resin layer 400 may include an optically clear resin (OCR), an epoxy resin, or a silicone resin, but the present disclosure is not limited thereto. The material of the resin layer 400 is not particularly limited as long as it can transmit light therethrough without causing damage to the light sources 120.

The optical member 600 may be disposed on the resin layer 400. The optical member 600 may be disposed in the region defined by the side mold 510. Although not specifically illustrated, the optical member 500 may be fixed to the side surfaces of the side mold 510 by an adhesive member.

Specifically, the wavelength filter layer 610, the light guide film 620, the diffusion sheet 630, and the wavelength conversion layer 640 may be sequentially disposed on the resin layer 400 along the third direction Z. The wavelength filter layer 610, the light guide film 620, the diffusion sheet 630, and the wavelength conversion layer 640 may be disposed to be spaced apart from one another in the third direction Z. The wavelength filter layer 610, the light guide film 620, the diffusion sheet 630, and the wavelength conversion layer 640 may be a predetermined distance apart from one another in the third direction Z and may thus diffuse light emitted from the light sources 120 to prevent the light from being condensed. At least one of the wavelength filter layer 610, the light guide film 620, the diffusion sheet 630, and the wavelength conversion layer 640 may be fixed to the side surfaces of the side mold 510 by an adhesive member. The side surfaces of the wavelength filter layer 610, the side surfaces of the light guide film 620, the side surfaces of the diffusion sheet 630, and the side surfaces of the wavelength conversion layer 640 may be substantially aligned with one another.

Referring to FIG. 6, the first and second light source units UT1 and UT2 may be disposed adjacent to each other. The first substrates 110 of the first and second light source units UT1 and UT2 may be disposed to adjoin each other along the first direction X. The right side of the first substrate 110 of the first light source unit UT1 and the left side of the first substrate 110 of the second light source unit UT2 may adjoin each other. Thus, the first substrates 110 of the first and second light source units UT1 and UT2 may be connected to each other.

The reflective layer 300 may be disposed on parts of the first substrates 110 that are exposed by the light sources 120. The reflective layer 300 may be disposed on the first and second light source units UT1 and UT2. The reflective layer 300 may be disposed to overlap, in the third direction Z, with the opposing side surfaces of the first substrates 110 of the first and second light source units UT1 and UT2 that adjoin each other.

Figure 7:
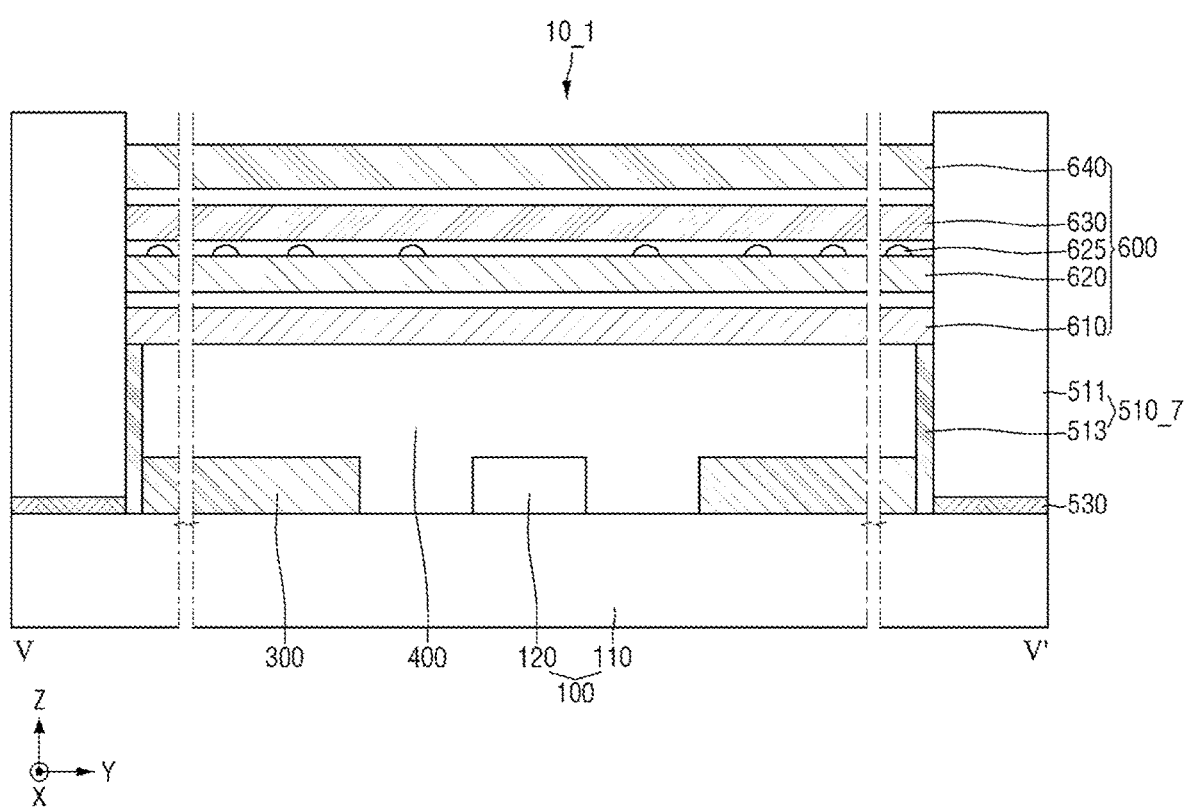
FIG. 7 is another example cross-sectional view taken along line V-V' of FIG. 4.

FIG. 7 is another example cross-sectional view taken along line V-V' of FIG. 4.

Referring to FIG. 7, a side mold 510_7 may include a partition wall 511 and a reflective coating layer 513, which are disposed on the inner side surfaces of the partition wall 511.

Specifically, the partition wall 511 may have substantially the same shape as the side mold 510 of FIG. 5. The reflective coating layer 513 is disposed at least on some portions of the inner side surfaces of the partition wall 511. The reflective coating layer 513 may cover some portions of the inner side surfaces of the partition wall 511. The reflective coating layer 513 may be disposed on the inner side surfaces of the partition wall 511, up to the height of a resin layer 400. The reflective coating layer 513 may be in contact with the side surfaces of the resin layer 400 and the side surfaces of a reflective layer 300. However, the present disclosure is not limited to this. Alternatively, the reflective coating layer 513 may be disposed to cover the entire inner side surfaces of the partition wall 511.

The reflective coating layer 513 may include a material with high reflectance such as a metal. In one embodiment, the reflective coating layer 513 may be formed of a metal-based material such as, for example, silver (Ag), copper (Cu), aluminum (Al), nickel (Ni), lanthanum (La), or an alloy thereof, or for example, indium tin oxide (ITO), indium zinc oxide, or indium tin zinc oxide (ITZO), but the present disclosure is not limited thereto. The reflective coating layer 513 may be deposited or coated directly on the inner side surfaces of the partition wall 511. In another embodiment, the reflective coating layer 513 may be attached to the inner side surfaces of the partition wall 511 by an adhesive layer.

The reflective coating layer 513 may reflect, toward the top surface of the reflective layer 300 and/or the top surface of the wavelength filter layer 610, at least some light emitted from the light sources 120 toward the wavelength filter layer 610 through the resin layer 400, but reflected from, rather than transmitted through, the wavelength filter layer 511 to travel toward the inner side surfaces of the partition wall 511. As described above, light reflected toward the inner side surfaces of the side mold 510_7, failing to be incident upon the wavelength filter layer 610, may be recycled by the reflective coating layer 513, which is disposed on the inner side surfaces of the partition wall 511, to reenter the wavelength filter layer 610. Accordingly, the reflective coating layer 513 can minimize the leakage of light and can make the angle of incidence of light upon the wavelength filter layer 610 to diversify.

Figure 8:
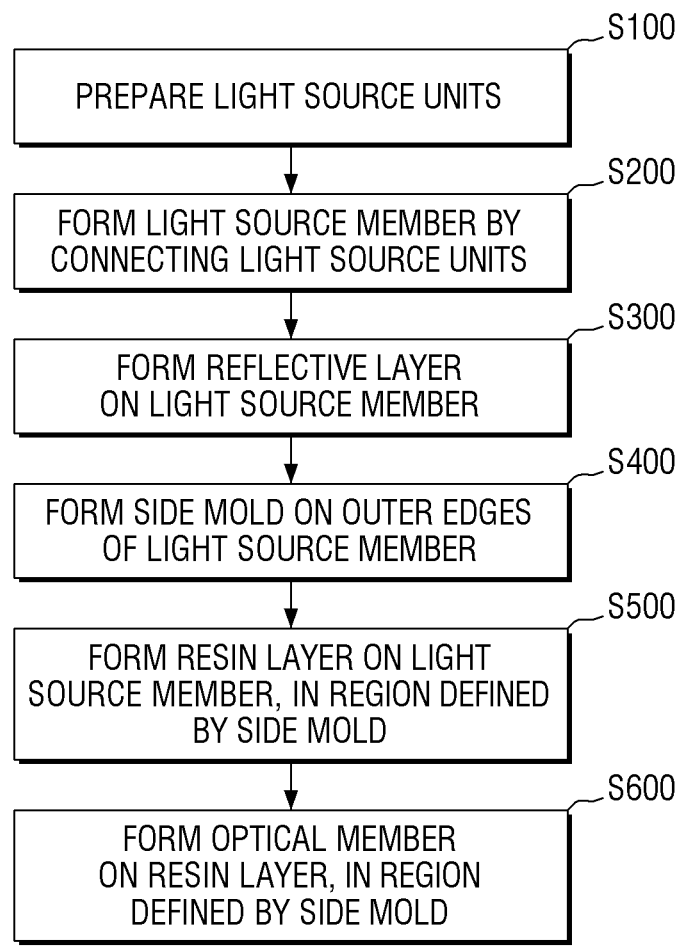
FIG. 8 is a flowchart illustrating a method of fabricating a display device according to an embodiment of the present disclosure.

FIG. 8 is a flowchart illustrating a method of fabricating a display device according to an embodiment of the present disclosure. FIGS. 9, 10, 11, 12, 13, and 14 are plan views or cross-sectional views illustrating the method of fabricating a display device according to an embodiment of the present disclosure.

Referring to FIG. 8, the method of fabricating a display device according to an embodiment of the present disclosure comprises preparing one or more light source units UT, i.e., first and second light source units UT1 and UT2 (S100), forming a light source member 100 by connecting the first and second light source units UT1 and UT2 (S200); forming a reflective layer 300 on the light source member 100 (S300), forming a side mold 510 on outer edges of the light source member 100 (S400), forming a resin layer 400 on the light source member 100, in the region defined by the side mold 510 (S500), and forming an optical member 600 on the resin layer 400, in the resin layer defined by the side mold 510 (S600).

Figure 9:
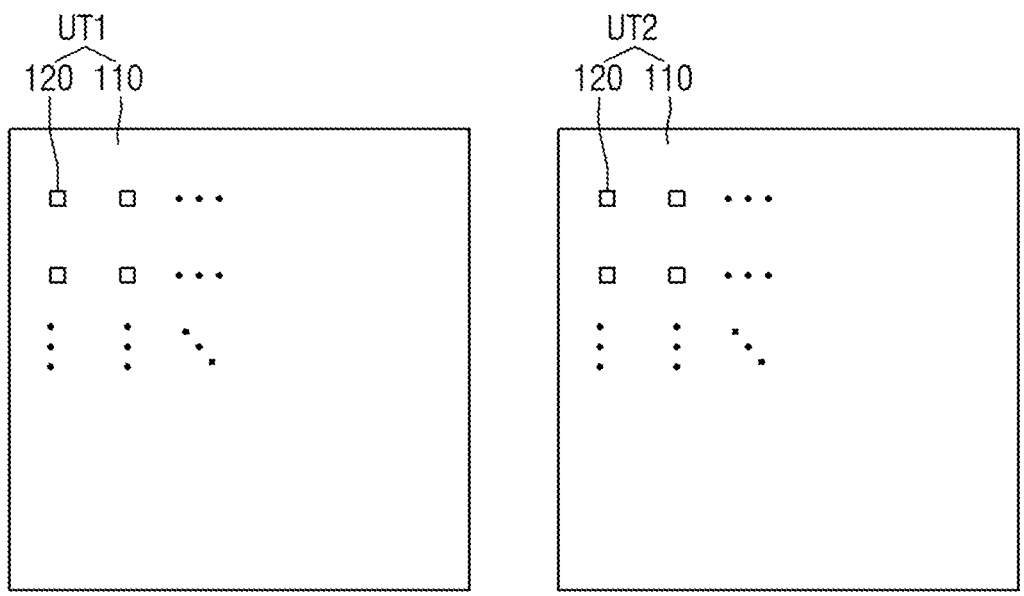
FIGS. 9, 10, 11, 12, 13, and 14 are plan views or cross-sectional views illustrating the method of fabricating a display device according to an embodiment of the present disclosure.

Firstly, as shown in FIG. 9, a plurality of light source units UT are prepared (S100 of FIG. 8).

Specifically, referring to FIGS. 8 and 9, the first and second light source units UT1 and UT2 are prepared. Each of the first and second light source units UT1 and UT2 may include a first substrate 110 and a plurality of light sources 120, which are disposed on the first substrate 110. The first substrate 110 and the light sources 120 of each of the light source units UT are as described above with reference to FIGS. 1, 2, 3, 4, 5, 6, and 7, and thus, detailed descriptions thereof will be omitted.

Figure 10:
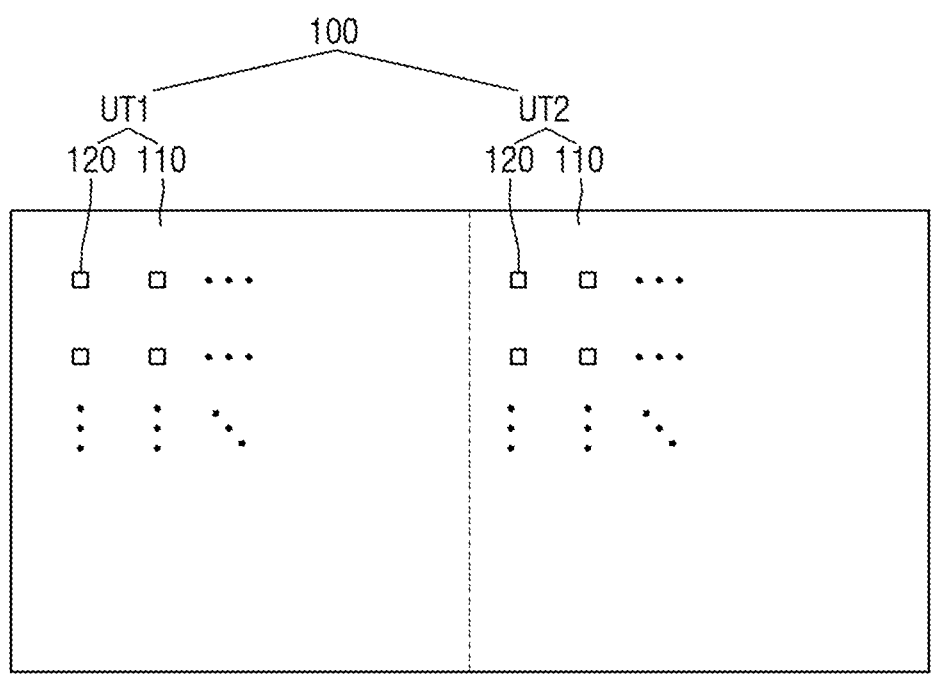
Figure 10:
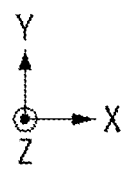

Secondly, as shown in FIG. 10, the light source member 100 is formed by connecting the light source units UT (S200 of FIG. 8).

Specifically, referring to FIGS. 8 and 10, the light source member 100 is formed by connecting the first and second light source units UT1 and UT2. The first and second light source units UT1 and UT2 may be aligned side-by-side in the first direction X. In this case, in a plan view, the first and second light source units UT1 and UT2 may be connected so that the right side of the first substrate 110 of the first light source unit UT1 and the left side of the first substrate 110 of the second light source unit UT2 may adjoin each other. As described above, the upper sides of the first substrates 110 of the first and second light source units UT1 and UT2 may be aligned side-by-side to fall on the same line, and the lower sides of the first substrates 110 of the first and second light source units UT1 and UT2 may be aligned side-by-side to fall on the same line.

The first substrates 110 of the first and second light source units UT1 and UT2 may be connected by a pair of complementary fastening patterns that are formed at the first substrates 110 of the first and second light source units UT1 and UT2, and this will be described later in detail.

Figure 11:
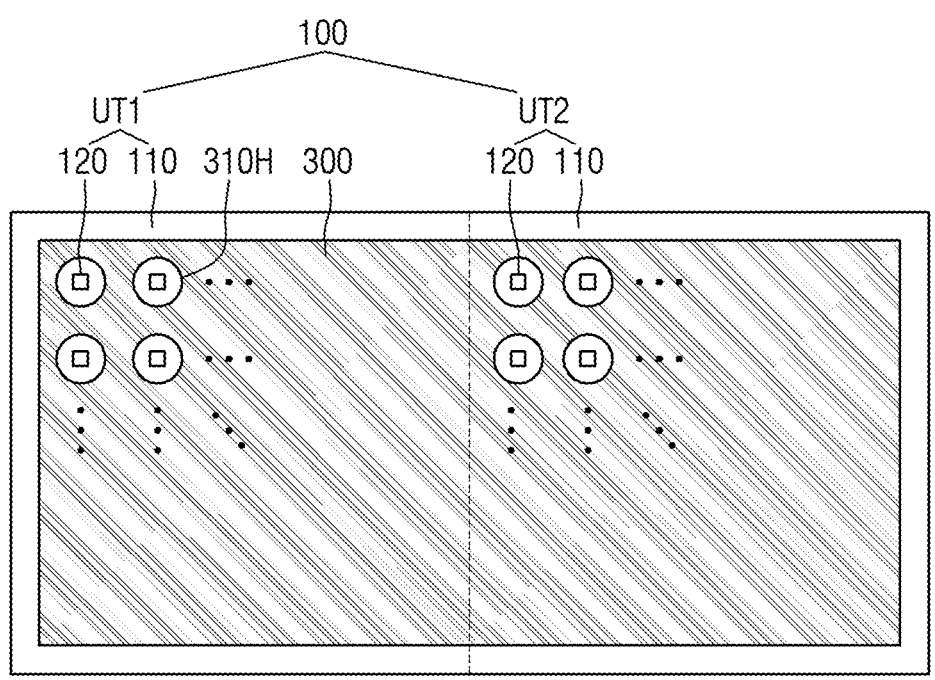

Thirdly, as shown in FIG. 11, the reflective layer 300 is formed on the light source member 100 (S300 of FIG. 8).

Specifically, referring to FIGS. 8 and 11, a reflective layer 300 is formed on the light source member 100, which is formed by connecting the first and second light source units UT1 and UT2, and a plurality of openings 310H are formed in the reflective layer 300. The reflective layer 300 may be formed to overlap the first and second light source units UT1 and UT2 simultaneously. The openings 310H of the reflective layer 300 may be disposed to correspond one-to-one to the light sources 120 of the first or second light source unit UT1 or UT2.

Figure 12:
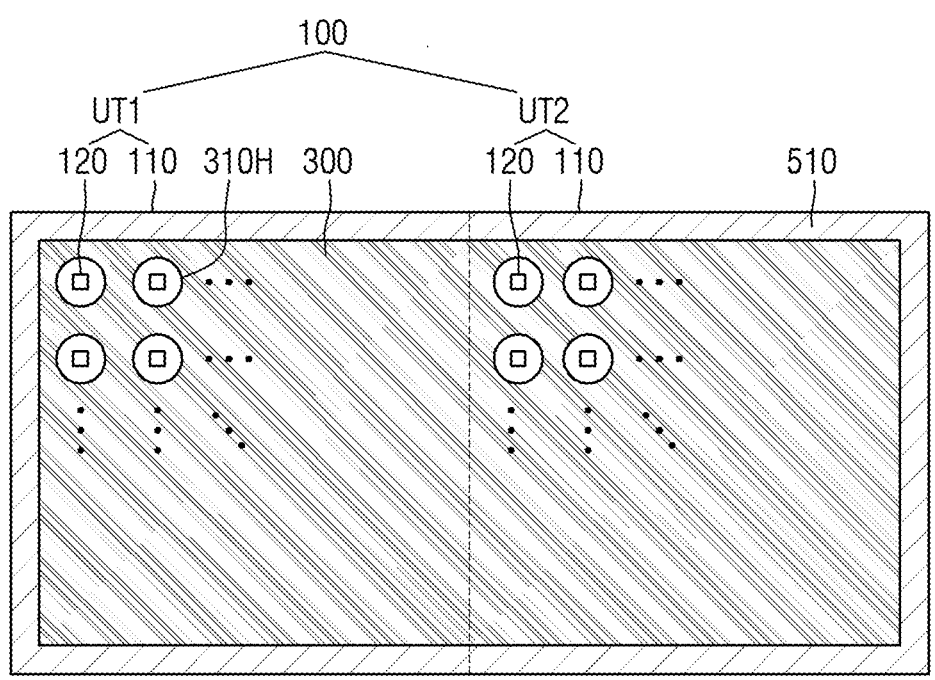

Fourthly, as shown in FIG. 12, the side mold 510 is formed on the outer edges of the light source member 100 (S400 of FIG. 8).

Specifically, referring to FIGS. 8 and 12, the side mold 510 may be formed on parts of the outer edges of the first substrates 110 of the light source member 100 that are exposed in the third direction Z by the reflective layer 300. In one embodiment, the side mold 510 may be fixedly attached to the top surfaces of the first substrates 110 of the light source member 100 by an adhesive member 530, which is interposed between the top surfaces of the first substrates 110 of the light source member 100 and the bottom surface of the side mold 510.

Figure 13:
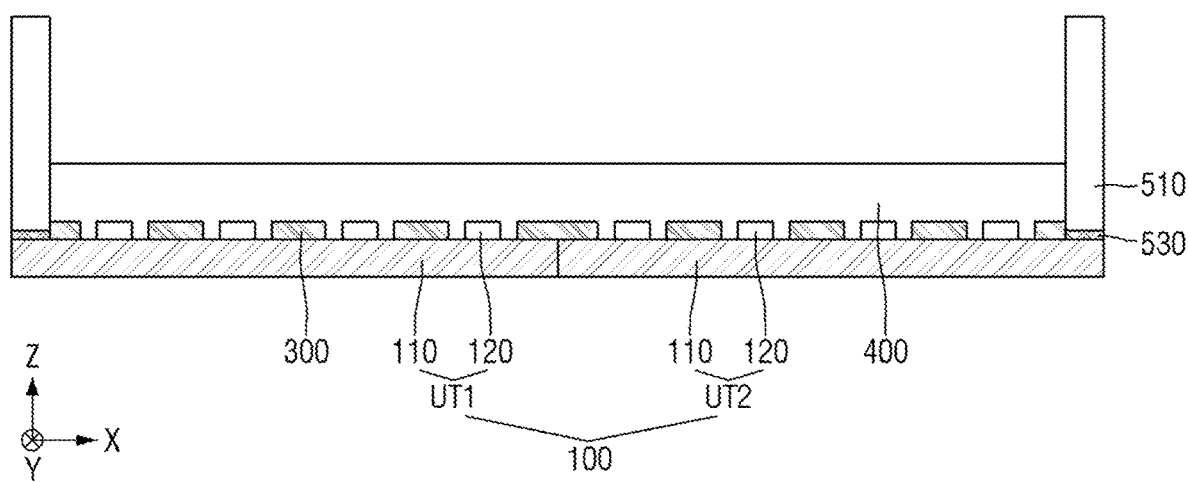

Fifthly, as shown in FIG. 13, the resin layer 400 is formed on the light source member 100, in the region defined by the side mold 510 (S500 of FIG. 8).

Specifically, referring to FIGS. 8 and 13, a material for forming the resin layer 400 may be applied in the region defined by the side mold 510. The material for forming the resin layer 400 may be a liquid material. The liquid material for forming the resin layer 400 may be guided by the side mold 510, which is disposed along the outer edges of the light source member 100 to form a closed space, and may thus be applied in the resin defined by the side mold 510. In this case, since the side mold 510 is formed to a greater height than the resin layer 400, the height h3 (as shown in FIG. 5) of the resin layer 400 can be controlled with the side mold 510. After the application of the liquid material for forming the resin layer 400 on the light source member 100, UV curing or thermal curing may be additionally performed to cure the resin layer 400.

Figure 14:
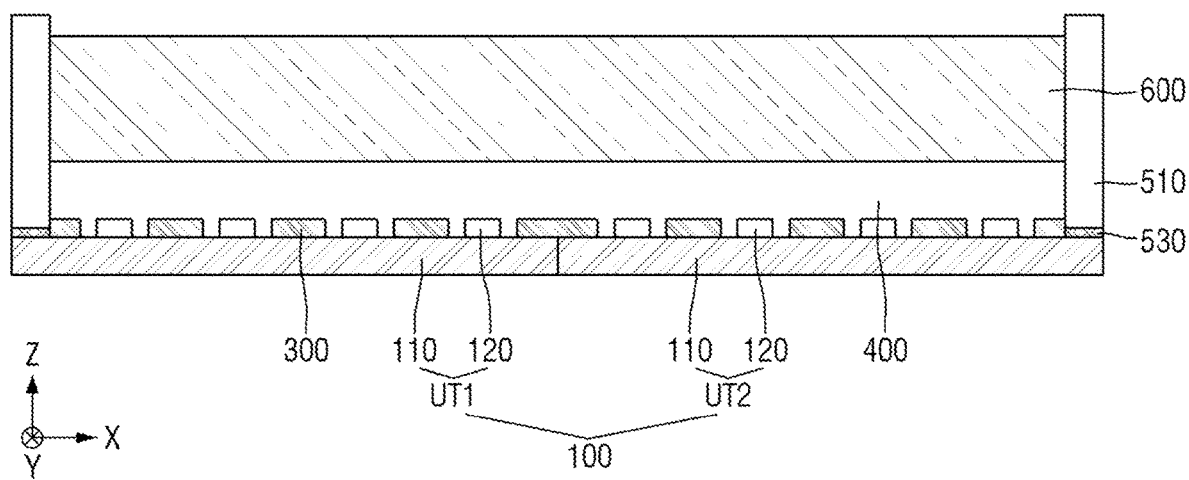

Sixthly, as shown in FIG. 14, the optical member 600 is formed on the resin layer 400, in the region defined by the side mold 510 (S600 of FIG. 8).

Specifically, referring to FIGS. 8 and 14, the optical member 600 is formed on the resin layer 400, in the region defined by the side mold 510. The optical member 600 may be fixedly attached to side surfaces of the side mold 510 by an optically clear adhesive (OCA) or an OCR. The side surfaces of the optical member 600 may be fixed to, and substantially aligned with, the side surfaces of the side mold 510. Thus, the side surfaces of the optical member 600 may be substantially aligned with the side surfaces of the resin layer 400, which is disposed in the region defined by the side mold 510.

Other embodiments of the present disclosure will hereinafter be described, focusing mainly on the differences with the above-described embodiments.

Figure 15:
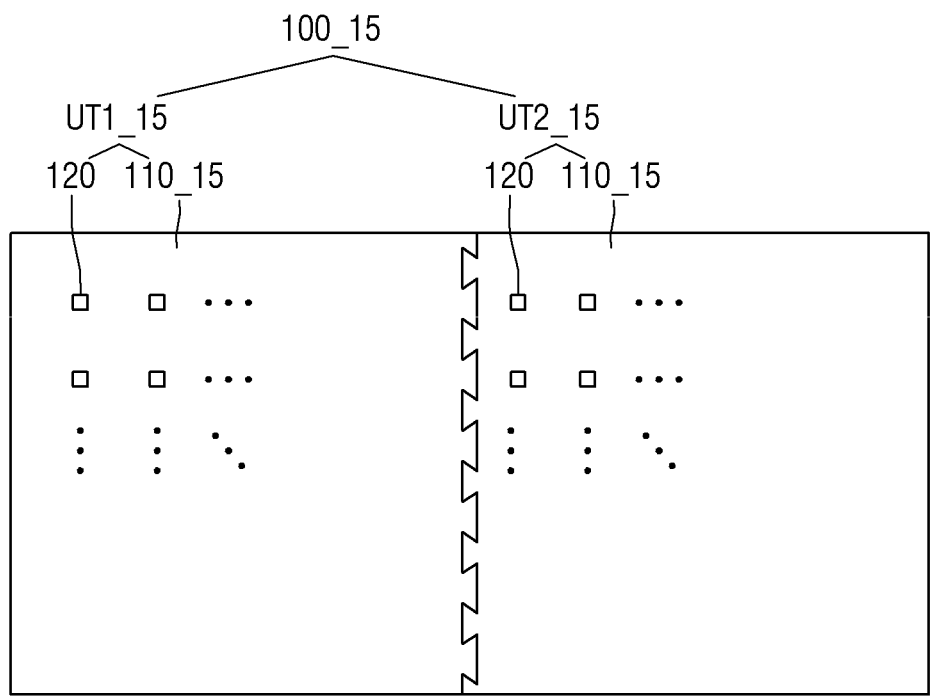
FIG. 15 is a plan view of a light source member according to another embodiment of the present disclosure.
Figure 16:
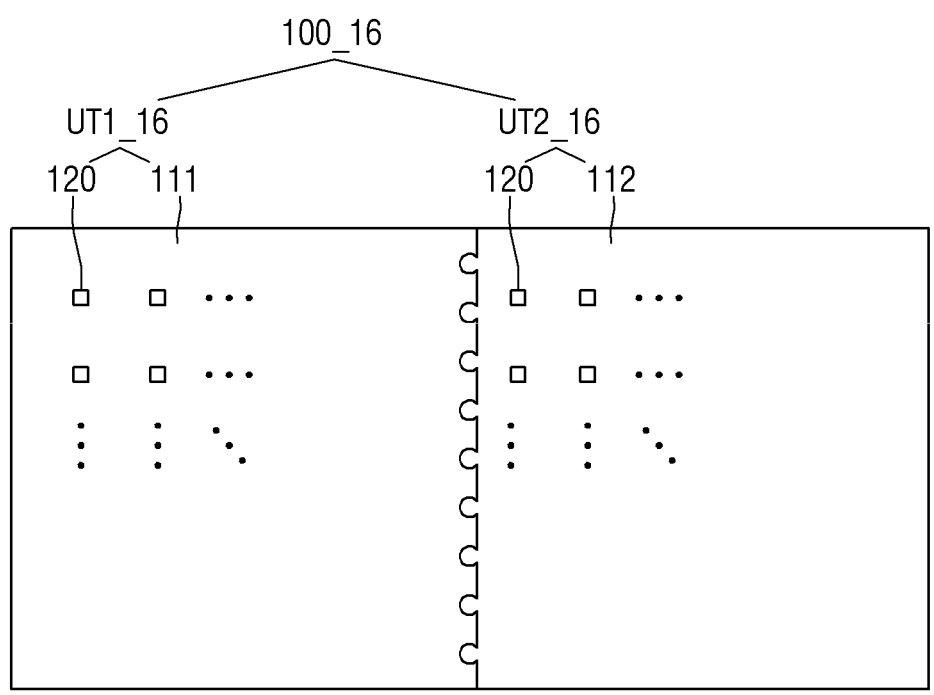
FIG. 16 is a plan view of a light source member according to another embodiment of the present disclosure.

FIG. 15 is a plan view of a light source member according to another embodiment of the present disclosure. FIG. 16 is a plan view of a light source member according to another embodiment of the present disclosure.

The embodiments of FIGS. 15 and 16 differ from the embodiment of FIG. 3 in that a pair of complementary fastening patterns are formed at first substrate of first and second light source units. That is, a pair of complementary fastening patterns is formed at the boundary between the first light source unit and the second light source unit.

Referring to FIGS. 15 and 16, a pair of complementary fastening patterns that can lock into each other may be formed on the right side surface of a first substrate of a first light source unit and the left side surface of a first substrate of a second light source unit.

First, referring to FIG. 15, the right side of a first substrate 110_15 of a first light source unit UT1_15 may be uneven. A regularly repeating pattern of protrusions and recesses may be formed on the right side surface of the first substrate 110_15 of the first light source unit UT1_15. The protrusions and the recesses formed on the right side surface of the first substrate 110_15 of the first light source unit UT1_15 may substantially have a trapezoidal shape.

The left side of a first substrate 110_15 of a second light source unit UT2_15 that is in contact with, and connected to, the right side surface of the first substrate 110_15 of the first light source unit UT1_15 may also be uneven. A regularly repeating pattern of protrusions and recesses may also be formed on the left side surface of the first substrate 110_15 of the second light source unit UT2_15. The pattern formed on the left side surface of the first substrate 110_15 of the second light source unit UT2_15 may be complementary to the pattern formed on the right side surface of the first substrate 110_15 of the first light source unit UT1_15. Accordingly, the protrusions and the recesses formed on the left side surface of the first substrate 110_15 of the second light source unit UT2_15 may also substantially have a trapezoidal shape.

In a case where the pattern on the right side surface of the first substrate 110_15 of the first light source unit UT1_15 is complementary to the pattern on the left side surface of the first substrate 110_15 of the second light source unit UT2_15, the right side surface of the first substrate 110_15 of the first light source unit UT1_15 and the left side surface of the first substrate 110_15 of the second light source unit UT2_15 can lock into each other so that the first and second light source units UT1_15 and UT2_15 can be fixedly connected. In this case, the first and second light source units UT1_15 and UT2_15 can be connected without the aid of an additional adhesive member. Also, since the first and second light source units UT1_15 and UT2_15 are connected by making the first substrate 110_15 of the first and second light source units UT1_15 and UT2_15 interlocked each other, alignment error can be reduced, and the bonding between the first and second light source units UT1_15 and UT2_15 can be improved.

Referring to FIG. 16, a first substrate 111 of a first light source unit UT1_16 and a first substrate 112 of a second light source unit UT2_16 may have different shapes in a plan view. Specifically, a plurality of recesses may be formed on a right side of the first substrate 111 of the first light source unit UT1_16. A plurality of protrusions may be formed on the left side of the first substrate 112 of the second light source unit UT2_16. The recesses on the right side surface of the first substrate 111 of the first light source unit UT1_16 may be complementary to the protrusions on the left side surface of the first substrate 112 of the second light source unit UT2_16. Accordingly, since the first and second light source units UT1_16 and UT2_16 can be fixedly connected by making the first substrates 111 and 112 of the first and second light source units UT1_16 and UT2_16 interlocked each other, alignment error can be reduced, and the bonding between the first and second light source units UT1_16 and UT2_16 can be improved.

Figure 17:
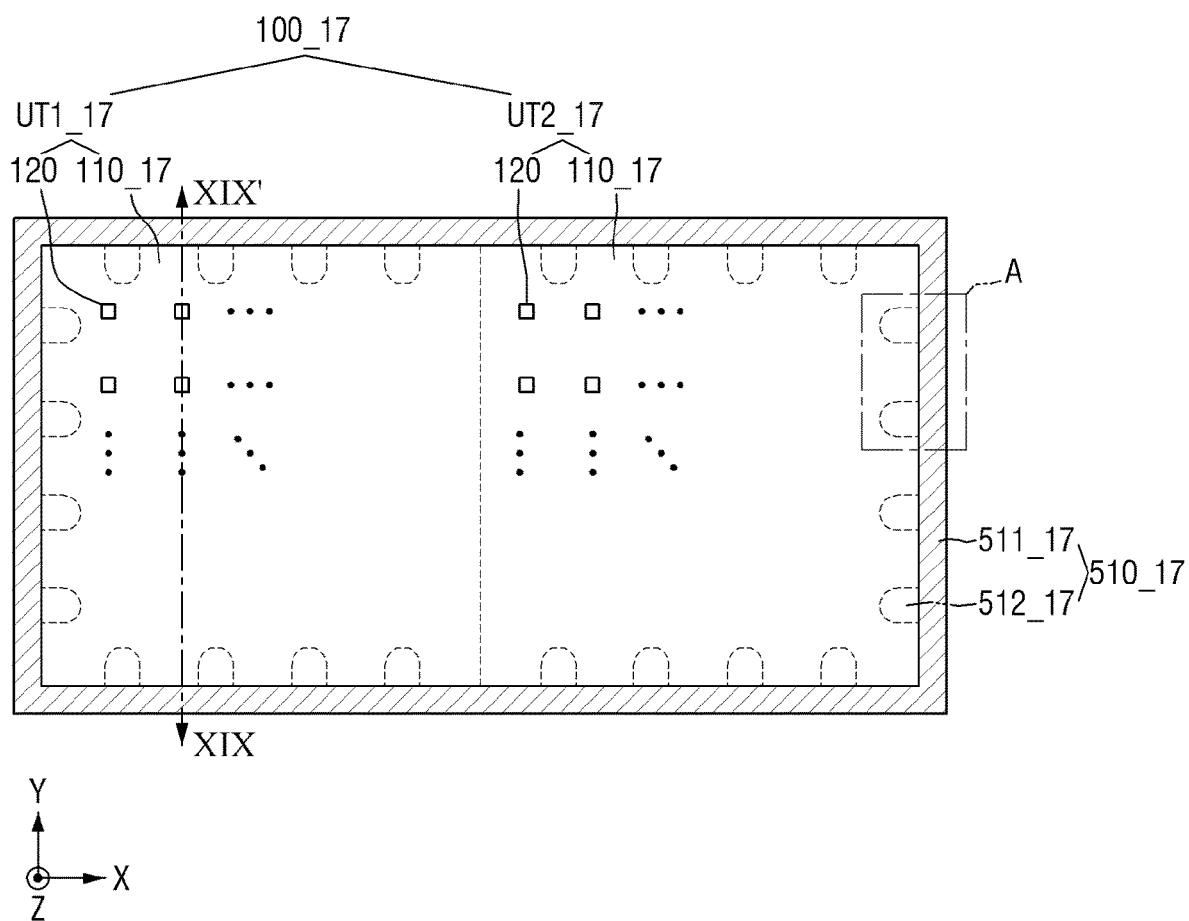
FIG. 17 is a layout view illustrating the relative positions of a light source member and a side mold according to another embodiment of the present disclosure.
Figure 18:
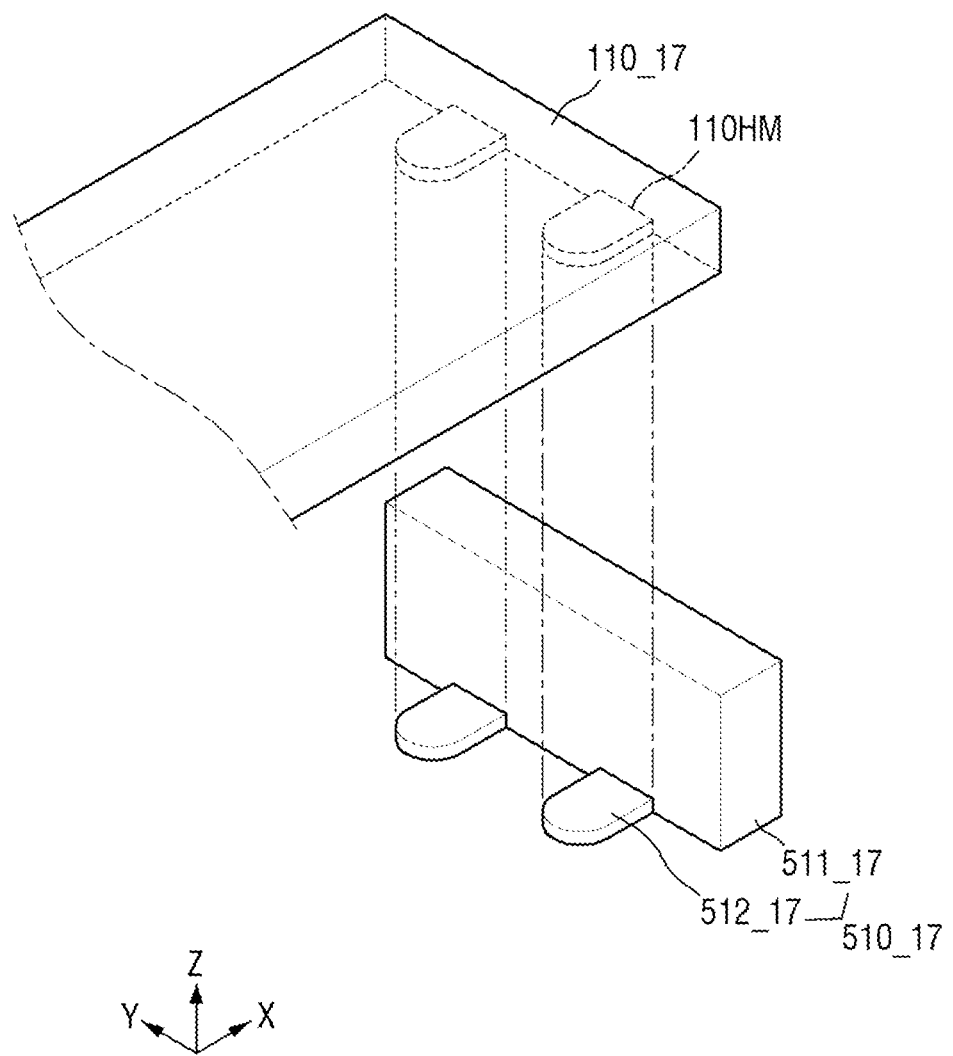
FIG. 18 is an enlarged exploded perspective view illustrating an area A of FIG. 17.
Figure 19:
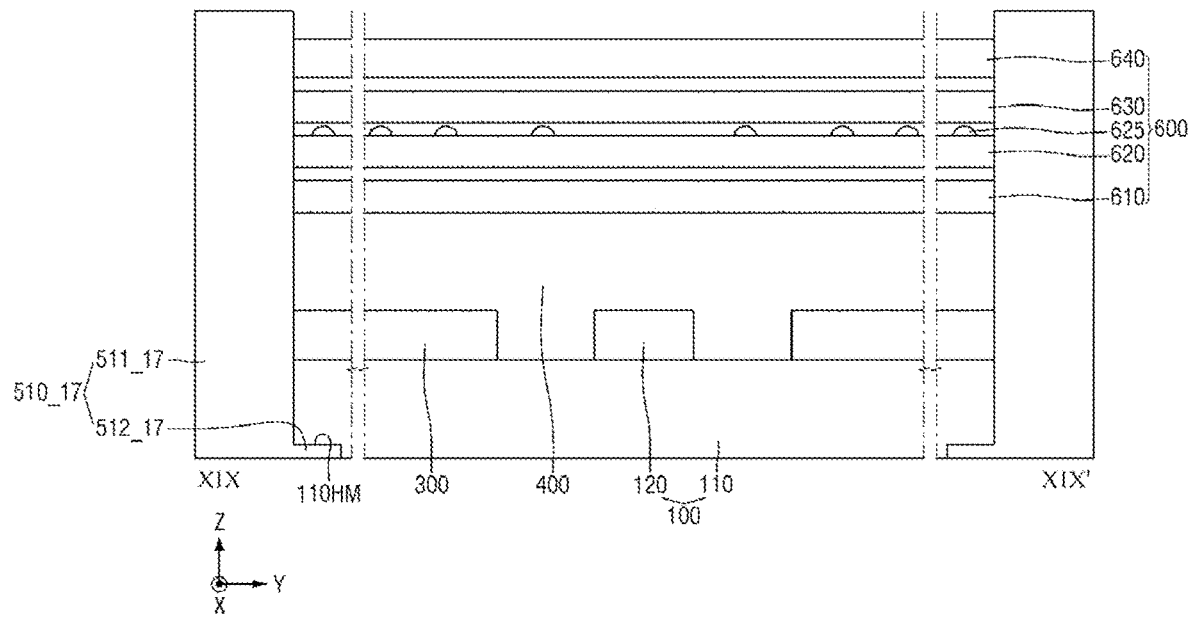
FIG. 19 is an example cross-sectional view taken along line XIX-XIX' of FIG. 17.

FIG. 17 is a layout view illustrating the relative positions of a light source member and a side mold according to another embodiment of the present disclosure. FIG. 18 is an enlarged exploded perspective view illustrating an area A of FIG. 17. FIG. 19 is an example cross-sectional view taken along line XIX-XIX' of FIG. 17.

The embodiment of FIGS. 17, 18, and 19 differs from the embodiment of FIG. 5 in that a side mold 510_17 is fastened directly to the bottom surface of a first substrate 110_17. Referring to FIGS. 17, 18, and 19, the side mold 510_17 may include a partition wall 511_17 and a plurality of fastening parts 512_17, which protrude from the partition wall 511_17. A plurality of grooves 110HM, into which the fastening parts 512_17 of the side mold 510_17 are to be fastened, are formed in the first substrate 110_17.

The partition wall 511_17 has substantially the same shape as the side mold 510 of FIG. 5. The partition wall 511_17 may be disposed to surround outer side surfaces of a light source member 100_17. Specifically, the partition wall 511_17 may be disposed to surround the outer side surfaces of the first substrate 110_17 of the light source member 100_17. Thus, the inner side surfaces of the partition wall 511_17 may be disposed at least in part to adjoin the outer side surfaces of the first substrate 110_17. In the embodiment of FIGS. 17, 18, and 19, since the partition wall 511_17 is disposed to surround the side surfaces of the first substrate 110_17, the side surfaces of the first substrate 110_17, the side surfaces of a reflective layer 300, the side surfaces of a resin layer 400, and the side surfaces of an optical member 600 may be aligned with the inner side surfaces of the partition wall 511_17.

The fastening parts 512_17 may protrude from some portions of the inner side surfaces of the partition wall 511_17 into a region defined by the partition wall 511_17. The fastening parts 512_17 may be arranged at regular intervals to protrude in a direction perpendicular to the direction in which the partition wall 511_17 extends, but the present disclosure is not limited thereto. The fastening parts 512_17 may be formed to protrude lower parts of the inner side surfaces of the partition wall 511_17. The fastening parts 512_17 may be integrally formed with the partition wall 511_17. The thickness, in a third direction Z, of the fastening parts 512_17 may be smaller than the thickness of the first substrate 110_17.

One or more fastening parts 512_17 may be formed on each of the inner side surfaces of the partition wall 511_17. The fastening parts 512_17, formed on each of the inner side surfaces of the partition wall 511_17, may be disposed to be spaced apart from one another. FIG. 17 illustrates that eight fastening parts 512_17 are formed on each of the inner side surfaces of the partition wall 511_17 that extend in a first direction X, and that four fastening parts 512_17 are formed on each of the inner side surfaces of the partition wall 511_17 that extend in a second direction Y, but the number of fastening parts 512_17 formed on each of the inner side surfaces of the partition wall 511_17 is not particularly limited.

The grooves 110HM may be formed in the first substrate 110_17 to couple the first substrate 110_17 and the side mold 510_17. Specifically, the grooves 110HM may be formed on the bottom surface of the first substrate 110_17 to correspond to the fastening parts 512_17 of the side mold 510_17. As the fastening parts 512_17 of the side mold 510_17 are inserted into the grooves 110HM, which are formed on the bottom surface of the first substrate 110_17, the side mold 510_17 may be fixedly attached to the first substrate 110_17.

The number of grooves 110HM formed on the first substrate 110_17 may be the same as the number of fastening parts 512_17 formed on the side mold 510_17, but the present disclosure is not limited thereto. In order that the first substrate 110_17 and the side mold 510_17 can be coupled by inserting the fastening parts 512_17 into the grooves 110HM, the fastening parts 512_17 and the grooves 110HM may have substantially the same size and shape, but the present disclosure is not limited thereto. In order to snuggly fix the side mold 510_17 to the first substrate 110_17, the grooves 110HM may be formed to be smaller in size than the fastening parts 512_17.

FIGS. 17 and 18 illustrate that the fastening parts 512_17 have the same shape and size, but the present disclosure is not limited thereto. The fastening parts 512_17, which protrude from the inner side surfaces of the side mold 510_17, may have different shapes and sizes. Accordingly, the grooves 110HM, which are formed in the first substrate 110_17 to correspond to the fastening parts 512_17, may also have different shapes and sizes. In this case, the fastening parts 512_17 can be inserted only into their respective grooves 110HM. Thus, by varying the sizes and shapes of the fastening parts 512_17 and the grooves 110HM, the precision of fastening the first substrate 110_17 and the side mold 510_17 can be improved.

Figure 20:
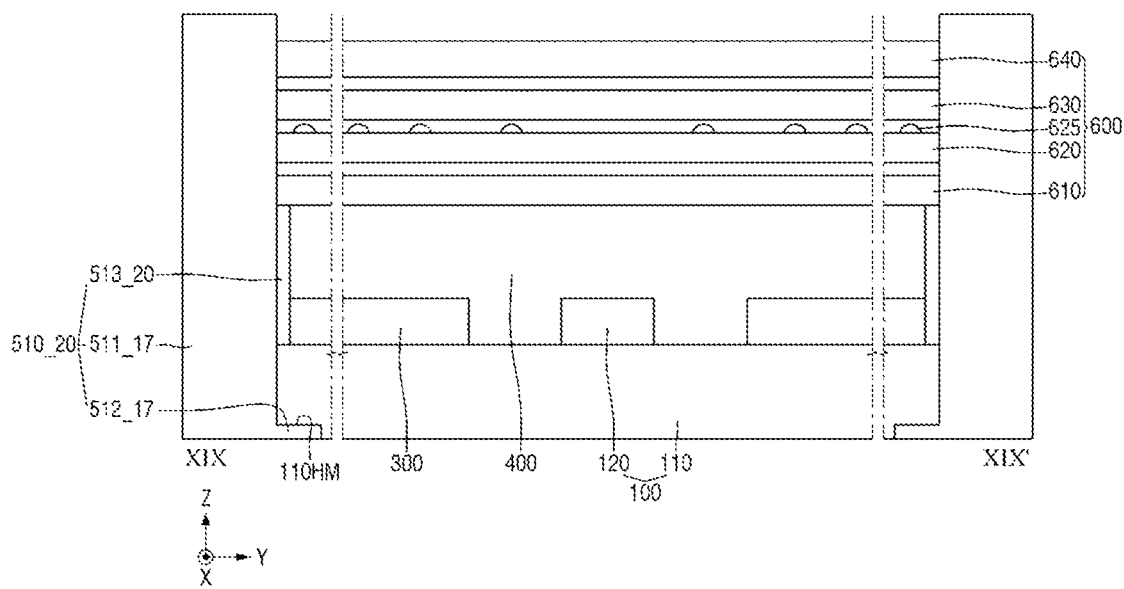
FIG. 20 is another example cross-sectional view taken along line XIX-XIX' of FIG. 17.

FIG. 20 is another example cross-sectional view taken along line XIX-XIX' of FIG. 17.

Referring to FIG. 20, a side mold 510_20 may further include a reflective coating layer 513_20, which are disposed on the inner side surfaces of a partition wall 511_17.

Specifically, the reflective coating layer 513_20 is disposed at least on some portions of the inner side surfaces of the partition wall 511_17. The reflective coating layer 513_20 may cover these portions of the inner side surfaces of the partition wall 511_17. The reflective coating layer 513_20 may be disposed on the inner side surfaces of the partition wall 511_17, up to the height of a resin layer 400 from the top surface of a first substrate 110. The reflective coating layer 513_20 may be in direct contact with the side surfaces of the resin layer 400 and the side surfaces of a reflective layer 300. However, the present disclosure is not limited to this. Alternatively, the reflective coating layer 513_20 may be disposed to cover the entire inner side surfaces of the partition wall 511_17.

The reflective coating layer 513_20 may include a material with high reflectance such as a metal. In one embodiment, the reflective coating layer 513_20 may be formed of a metal-based material such as, for example, silver (Ag), copper (Cu), aluminum (Al), nickel (Ni), lanthanum (La), or an alloy thereof, or for example, indium tin oxide (ITO), indium zinc oxide, or indium tin zinc oxide (ITZO), but the present disclosure is not limited thereto.

Figure 21:
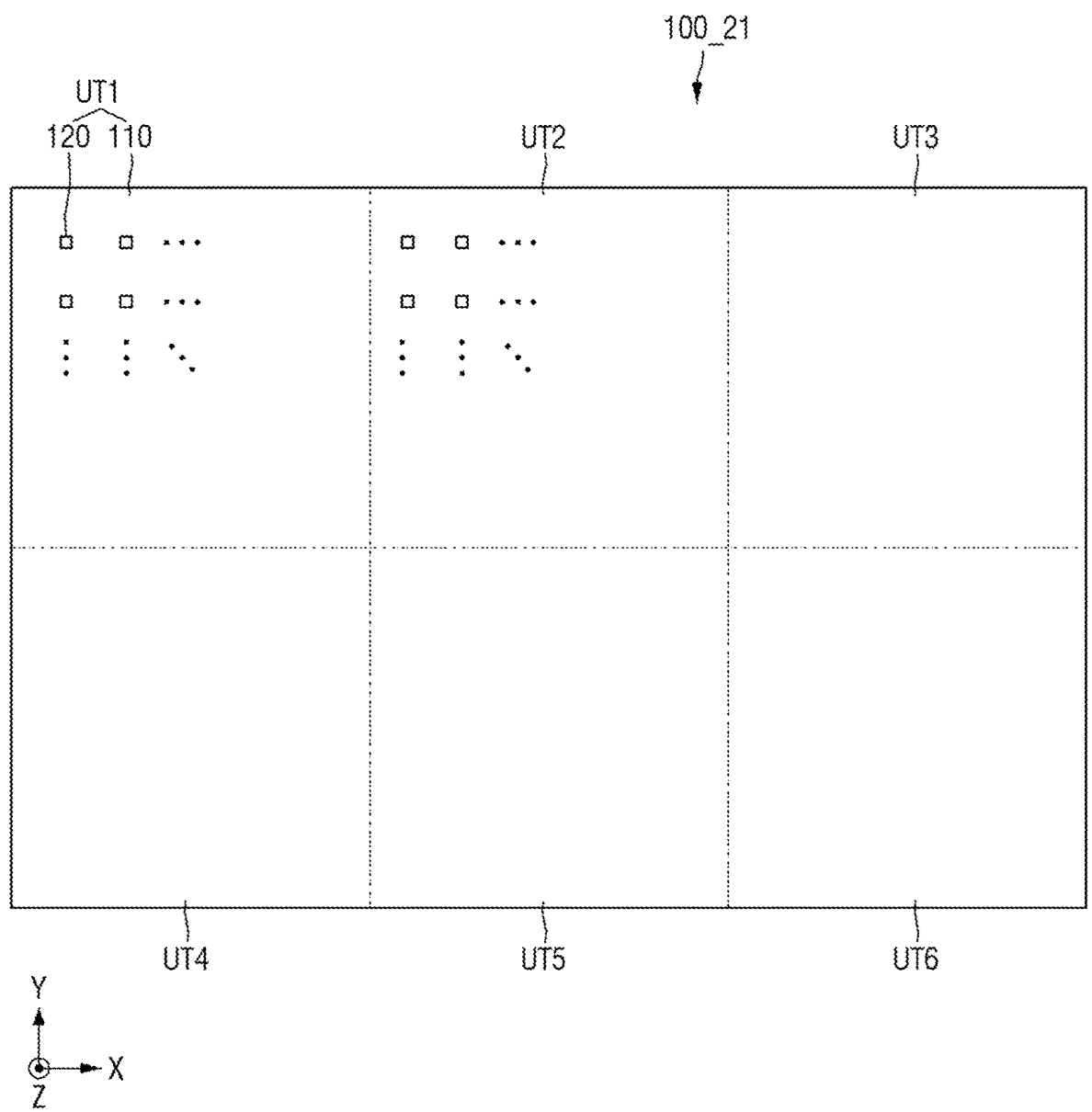
FIG. 21 is a plan view of a light source member according to another embodiment of the present disclosure.

FIG. 21 is a plan view of a light source member according to another embodiment of the present disclosure.

Referring to FIG. 21, a light source member 110_21 may include first through sixth light source units UT1, UT2, UT3, UT4, UT5, and UT6. The first through sixth light source units UT1, UT2, UT3, UT4, UT5, and UT6 may be arranged in a matrix form. Specifically, the first through third light source units UT1, UT2, and UT3 may be arranged side-by-side in a first row in a first direction X, and the fourth through sixth light source units UT4, UT5, and UT6 may be arranged side-by-side in a second row in the first direction X. A pair of opposing sides of first substrates 110 of each pair of adjacent light source units UT may be disposed to adjoin so that the corresponding pair of adjacent light source units UT can be connected. A light source member 100_21 is illustrated as including only six light source units UT, but the present disclosure is not limited thereto. The light source member 100_21 may include more than six light source units UT, even in which case, each pair of adjacent light source units UT may be disposed to adjoin.

In concluding the detailed description, those skilled in the art will appreciate that many variations and modifications can be made to the preferred embodiments without substantially departing from the principles of the present disclosure. Therefore, the disclosed preferred embodiments of the present disclosure are used in a generic and descriptive sense only and not for purposes of limitation.

What is claimed is:

1. A backlight unit comprising:
a substrate;
a plurality of light sources disposed on a first surface of the substrate;
a side mold having a closed loop shape and fixed to the substrate, the side mold surrounding the light sources;
a resin layer filling a region defined by the side mold; and
an optical member disposed on the resin layer, in the region defined by the side mold,
wherein a first height of the side mold measured from the first surface of the substrate is greater than a second height of the resin layer measured from the first surface of the substrate to an opposite surface of the resin layer.

2. The backlight unit of claim 1, further comprising:
an adhesive layer interposed between the substrate and the side mold,
wherein
the side mold is disposed on the first surface of the substrate and fixed on the first surface of the substrate by the adhesive layer.

3. The backlight unit of claim 1, wherein side surfaces of the optical member are aligned with side surfaces of the resin layer.

4. The backlight unit of claim 1, wherein
the substrate includes a plurality of grooves, which are on a second surface of the substrate that is opposite to the first surface of the substrate,
the side mold includes:
a partition wall, which is disposed to surround side surfaces of the substrate, and
a plurality of fastening parts, which protrude from the partition wall and correspond to the plurality of grooves, and
the side mold is fastened and fixedly attached to the substrate by the fastening parts.

5. The backlight unit of claim 4, wherein side surfaces of the optical member, side surfaces of the resin layer, and the side surfaces of the substrate surrounded by the partition wall are aligned with one another and are in direct contact with inner side surfaces of the partition wall.

6. The backlight unit of claim 1, further comprising:
a reflective layer disposed on the first surface of the substrate,
wherein a plurality of openings are formed in the reflective layer, which expose the light sources.

7. The backlight unit of claim 6, wherein the reflective layer and the light sources do not overlap in a thickness direction of the substrate.

8. The backlight unit of claim 1, further comprising:
a reflective coating layer disposed on inner side surfaces of the side mold.

9. The backlight unit of claim 1, wherein the light sources are light-emitting diodes (LEDs) or LED chips.

10. The backlight unit of claim 1, wherein the substrate is a printed circuit board (PCB).

11. A backlight unit comprising:
a light source member including a plurality of light source units, which are arranged in a matrix form and are disposed adjacent to one another;
a side mold disposed along edges of the light source member;
a resin layer filling a region, defined by the side mold, to cover the light source member; and
an optical member disposed on the resin layer, in the region defined by the side mold,
wherein
each of the plurality of light source units includes a substrate and a plurality of light sources, which are disposed on a first surface of the substrate,
substrates of each pair of adjacent light source units are connected, and
a first height of the side mold measured from the first surface of each of the substrates is greater than a second height of the resin layer measured from the first surface of each of the substrates to an opposite surface of the resin layer.

12. The backlight unit of claim 11, wherein
the plurality of light source units include a first light source unit and a second light source unit, which is disposed on a first side of the first light source unit, and
a first substrate of the first light source unit and a second substrate of the second light source unit are coupled.

13. The backlight unit of claim 12, a first side of the first substrate, on the first side of the first light source unit, is in direct contact with a second side of the second substrate, on a second side of the second light source unit that is opposite to a first side of the second light source unit.

14. The backlight unit of claim 12, wherein a first side of the first substrate of the first light source unit, on the first side of the first light source unit, and a second side of the second substrate of the second light source unit, on a second side of the second light source unit that is opposite to a first side of the second light source unit, include a pair of complementary patterns of protrusions and recesses.

15. The backlight unit of claim 12, wherein the side mold is disposed on the first and second light source units to surround the plurality of light sources of each of the first and second light source units.

16. The backlight unit of claim 11, wherein the optical member includes:
a wavelength filter layer which is disposed on the resin;
a diffusion sheet which is disposed on the wavelength filter layer; and
a wavelength conversion sheet which is disposed on the diffusion sheet.

17. The backlight unit of claim 16, wherein side surfaces of the resin layer is aligned with side surfaces of the wavelength filter layer, side surfaces of the diffusion sheet, and side surfaces of the wavelength conversion sheet.

18. A display device comprising:
a backlight unit including a light source member, the light source member including a plurality of light source units, which are arranged in a matrix form and are disposed adjacent to one another, a side mold disposed to surround the light source member, a resin layer filling a region, defined by the side mold, to cover the light source member, and an optical member disposed on the resin layer, in the region defined by the side mold; and a display panel disposed on the backlight unit, wherein each of the plurality of light source units includes a substrate and a plurality of light sources, which are disposed on a first surface of the substrate, substrates of each pair of adjacent light source units are connected, and the side mold is fixed on the substrates of the plurality of light source units, a first height of the side mold measured from the first surface of each of the substrates is greater than a second height of the resin layer measured from the first surface of each of the substrates to an opposite surface of the resin layer.

19. The display device of claim 18, wherein the first height of the side mold is greater than a third height measured from the first surface of each of the substrates to a top surface of the optical member.

20. The blacklight unit of claim 11, wherein the substrates of each pair of adjacent light source units are physically connected to each other.

21. The display device of claim 18, wherein the substrates of each pair of adjacent light source units are physically connected to each other.

* * * * *